(12) United States Patent
Sutedja et al.

(10) Patent No.: US 8,978,039 B2
(45) Date of Patent: *Mar. 10, 2015

(54) COMMUNICATION DEVICE AND METHOD FOR COHERENT UPDATING OF COLLATED MESSAGE LISTINGS

(71) Applicant: Research In Motion Limited, Waterloo (CA)

(72) Inventors: Darsono Sutedja, Hudson, NH (US); John Bennett Parrett, Amherst, NH (US); Katerina Doudkin, Haverhill, MA (US)

(73) Assignee: Blackberry Limited, Waterloo (CA)

( * ) Notice: Subject to any disclaimer, the term of this patent is extended or adjusted under 35 U.S.C. 154(b) by 104 days.

This patent is subject to a terminal disclaimer.

(21) Appl. No.: 13/720,719

(22) Filed: Dec. 19, 2012

(65) Prior Publication Data

US 2013/0110953 A1    May 2, 2013

Related U.S. Application Data

(63) Continuation of application No. 13/025,822, filed on Feb. 11, 2011, now Pat. No. 8,375,400.

(51) Int. Cl.
*H04L 12/58* (2006.01)
*G06F 9/50* (2006.01)
(Continued)

(52) U.S. Cl.
CPC .............. *H04L 51/16* (2013.01); *G06F 9/5038* (2013.01); *G06F 9/54* (2013.01); *G06Q 10/107* (2013.01)
USPC .......................................... 719/310; 718/106

(58) Field of Classification Search
CPC ....... G06F 9/54; G06F 9/3851; G06F 9/5038; G06F 9/34

See application file for complete search history.

(56) References Cited

U.S. PATENT DOCUMENTS

| | | |
|---|---|---|
| 4,878,218 A | 10/1989 | Takada |
| 5,003,577 A | 3/1991 | Ertz et al. |

(Continued)

FOREIGN PATENT DOCUMENTS

WO    03060742    7/2003

OTHER PUBLICATIONS

Razali Jidin, Extending the thread programming model across hybrif FPGA/CPU architectures, Apr. 15, 2005.*

(Continued)

*Primary Examiner* — Lechi Truong
(74) *Attorney, Agent, or Firm* — Novak Druce Connolly Bove + Quigg LLP

(57) ABSTRACT

A device, system and method are provided for presenting message threads in a device display where messages may have a persistent or intermediate status. A list of message threads is displayed, collated according to a given message thread attribute, is displayed. When a new message is detected belonging to one of the message threads, if the message has a persistent status it is added to the message thread and the collating message thread attribute for that thread is updated. If the message has an intermediate status, it may be added to the message thread but the collating message thread attribute for that message is deferred until the intermediate status is changed to a persistent status. The collated list of message threads is then updated. By deferring updates to the collating message thread attribute when a message has an intermediate status, disruption to the order of the collated list is mitigated.

18 Claims, 16 Drawing Sheets

(51) Int. Cl.
*G06F 9/54* (2006.01)
*G06Q 10/10* (2012.01)

(56) References Cited

U.S. PATENT DOCUMENTS

| | | | |
|---|---|---|---|
| 6,952,824 B1 * | 10/2005 | Hooper et al. | 718/100 |
| 7,143,091 B2 | 11/2006 | Charnock et al. | |
| 7,178,109 B2 * | 2/2007 | Hewson et al. | 715/790 |
| 7,313,385 B2 | 12/2007 | Yabe | |
| 7,359,936 B2 | 4/2008 | Gruen et al. | |
| 7,568,011 B2 | 7/2009 | Bocking et al. | |
| 7,571,354 B2 * | 8/2009 | Susarla et al. | 714/38.12 |
| 7,707,257 B2 | 4/2010 | Taieb et al. | |
| 7,716,593 B2 | 5/2010 | Durazo et al. | |
| 7,720,917 B2 | 5/2010 | Van Belle et al. | |
| 7,720,921 B2 | 5/2010 | Heidloff et al. | |
| 7,752,279 B2 | 7/2010 | Hardy et al. | |
| 7,769,144 B2 | 8/2010 | Yao et al. | |
| 7,788,326 B2 | 8/2010 | Buchheit et al. | |
| 7,831,673 B1 | 11/2010 | Cohen et al. | |
| 7,870,204 B2 | 1/2011 | LeVasseur et al. | |
| 2003/0163537 A1 | 8/2003 | Rohall et al. | |
| 2004/0260756 A1 | 12/2004 | Forstall et al. | |
| 2005/0004990 A1 | 1/2005 | Durazo et al. | |
| 2005/0108332 A1 | 5/2005 | Vaschillo et al. | |
| 2005/0193345 A1 | 9/2005 | Klassen et al. | |
| 2006/0069734 A1 | 3/2006 | Gersh et al. | |
| 2007/0005715 A1 | 1/2007 | LeVasseur et al. | |
| 2007/0005716 A1 | 1/2007 | LeVasseur et al. | |
| 2007/0106729 A1 | 5/2007 | Adams et al. | |
| 2007/0143428 A1 | 6/2007 | Kumar et al. | |
| 2007/0232360 A1 | 10/2007 | Bocking et al. | |
| 2008/0037762 A1 | 2/2008 | Shaffer et al. | |
| 2009/0280843 A1 | 11/2009 | Wisebourt et al. | |
| 2010/0031333 A1 | 2/2010 | Mitchell et al. | |
| 2010/0070584 A1 | 3/2010 | Chen et al. | |
| 2010/0211889 A1 | 8/2010 | Durazo et al. | |
| 2011/0074552 A1 | 3/2011 | Norair et al. | |

OTHER PUBLICATIONS

Edmund Clarke; A machine checkable logic of knowledge for specifying security properties of electronic commerce protocols, 1998.
Crispin et al., "RFC 5256: Internet Message Access Protocol—SORT and THREAD Extensions", Jun. 2008, retrieved Jan. 30, 2011 from http://tools.ietf.org/html/rfc5256.
Google Inc., "Gmail Help: Using Filters", Jan. 20, 2011, retrieved Jan. 30, 2011 from http://mail.google.com/support/bin/answer.py?hl=en&answer=6579.
Google Inc., "Gmail Help: Conversations", Jan. 21, 2011, retrieved Jan. 30, 2011 from http://mail.google.com/support/bin/answer.py?answer=5900&hl=en.
Cignini et al., "E-Mail on the Move: Categorization, Filtering, and Alerting on Mobile Devices with the ifMail Prototype", in F. Crestani et al. (Eds.): Mobile and Ubiquitous Info. Access WS 2003, LNCS 2954, pp. 107-123, 2004.
"Saved Search", MozillaZine Knowledge Base, http://kb.mozillazine.org/Saved_Search, modified Mar. 15, 2006, retrieved Dec. 12, 2006.
Venolia et al., "Supporting Email Workflow", Microsoft Research Technical Report MSR-TR-2001-88, revised Dec. 2001.
Weiner, "PIEMail: A Personalized Information Environment Mail Tool", Master's Thesis CS-92-M13, Brown University Department of Computer Science, May 10, 1992.
Aspi's Drift, "Creating Gmail-like conversations with Outlook", May 20, 2007, retrieved Feb. 1, 2011 from http://www.aspisdrift.com/2007/04/creating-gmail-like-conversations-with.html.
Extended European Search report mailed May 7, 2012, in corresponding European patent application No. 11155107.3.

* cited by examiner

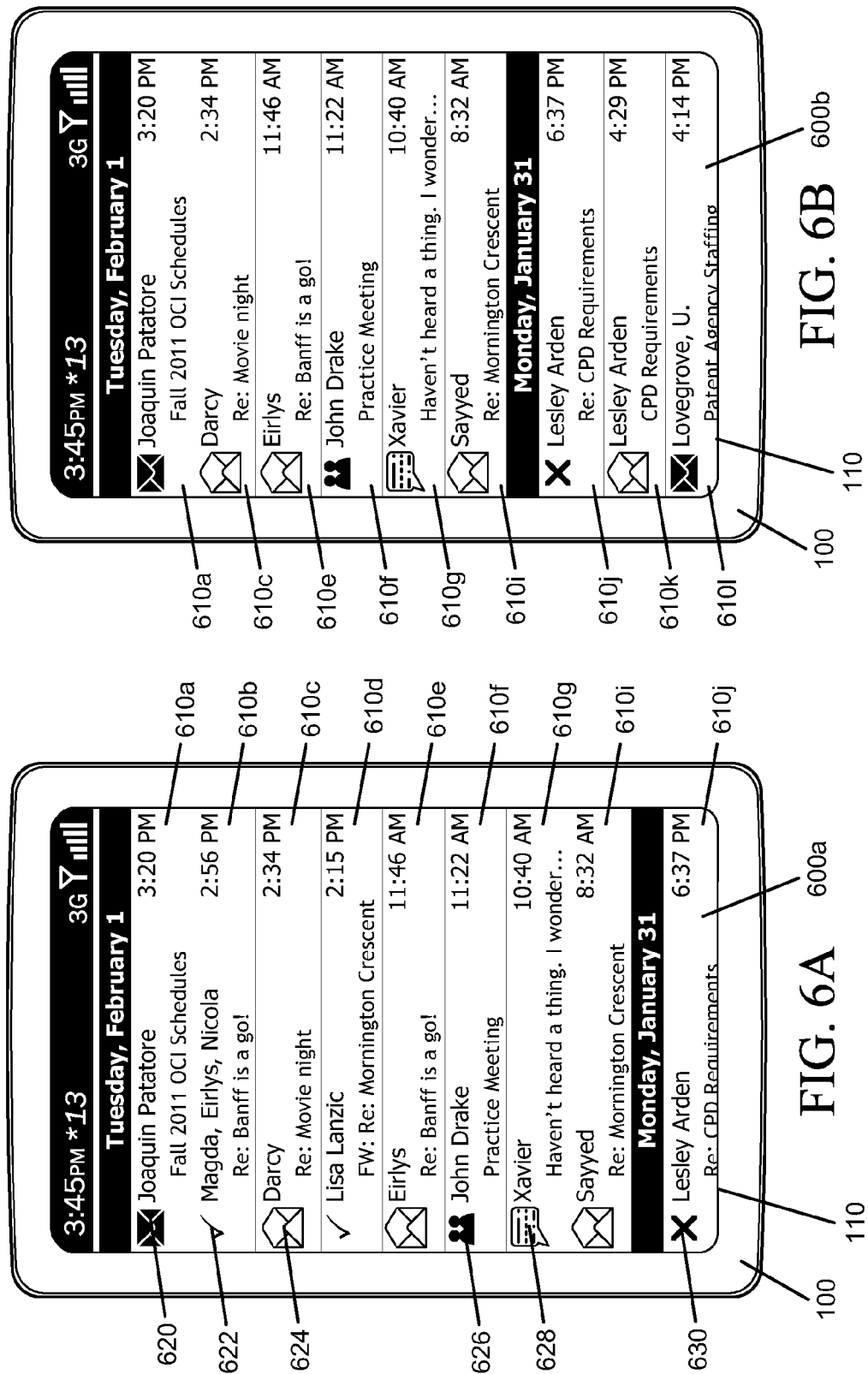

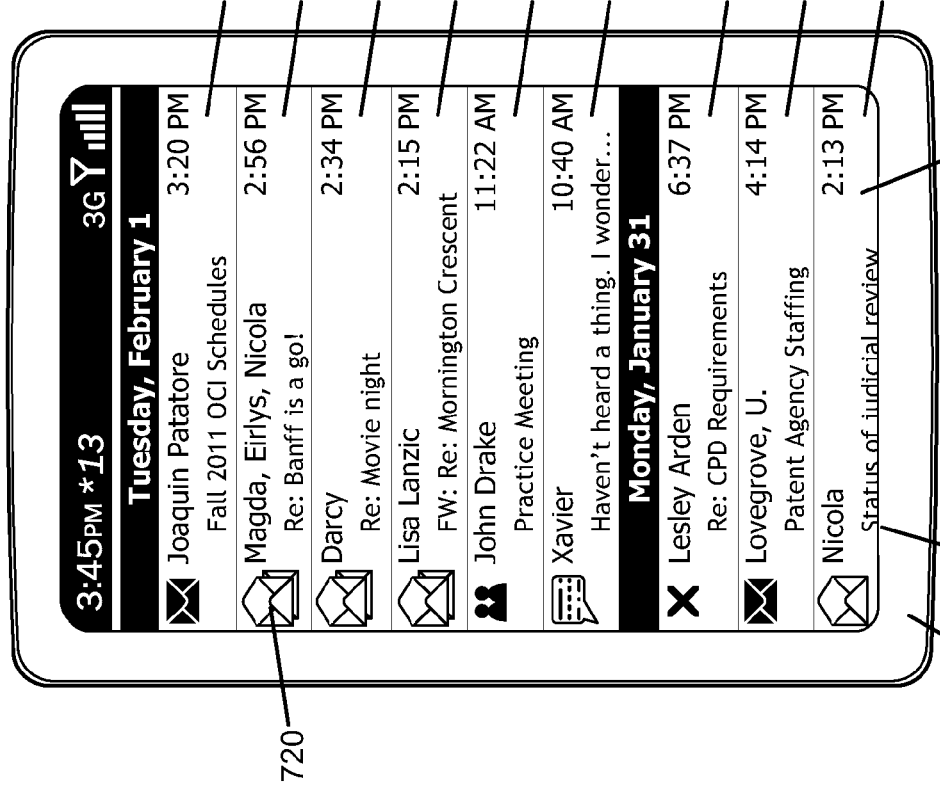
FIG. 7A
FIG. 7B

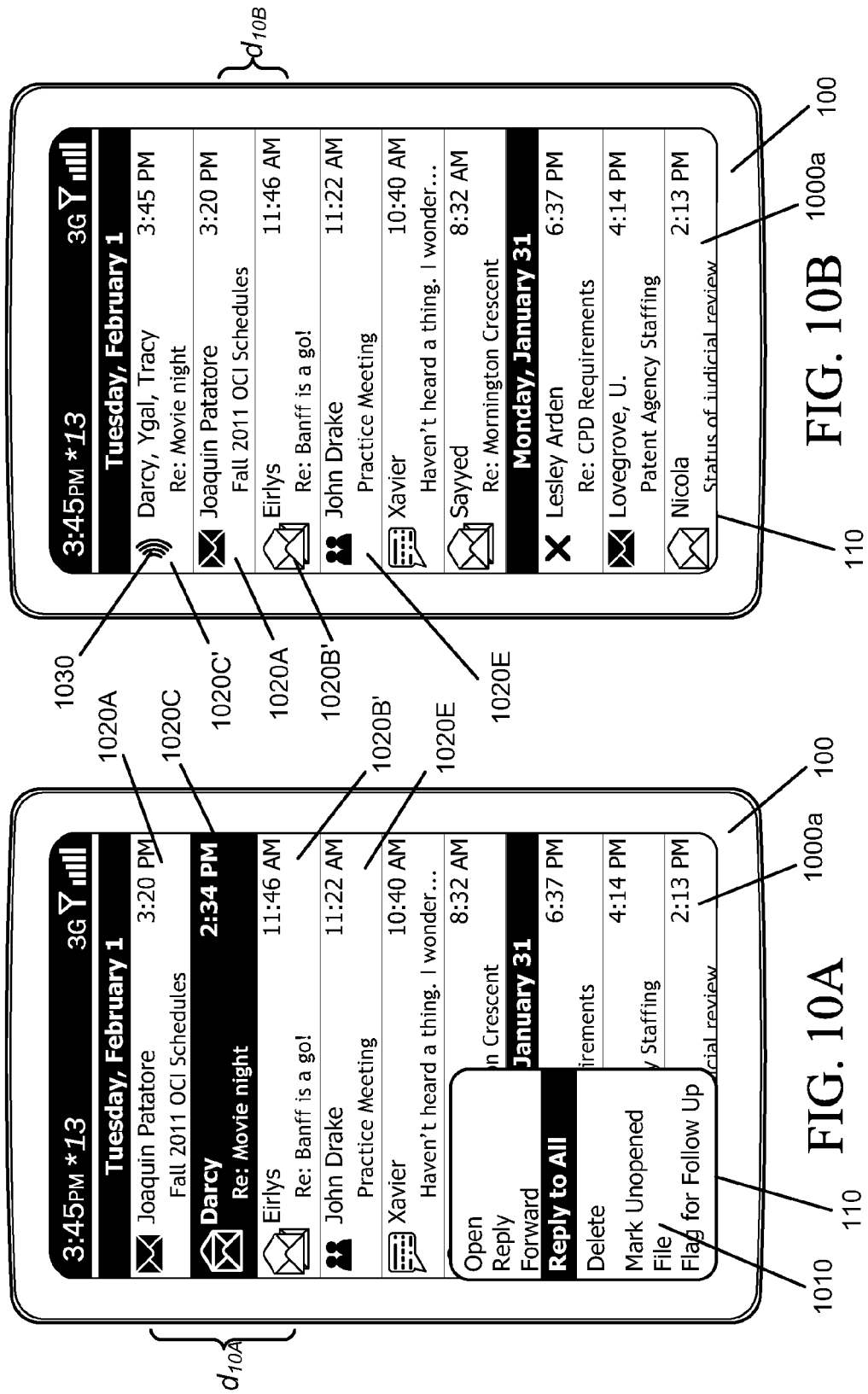

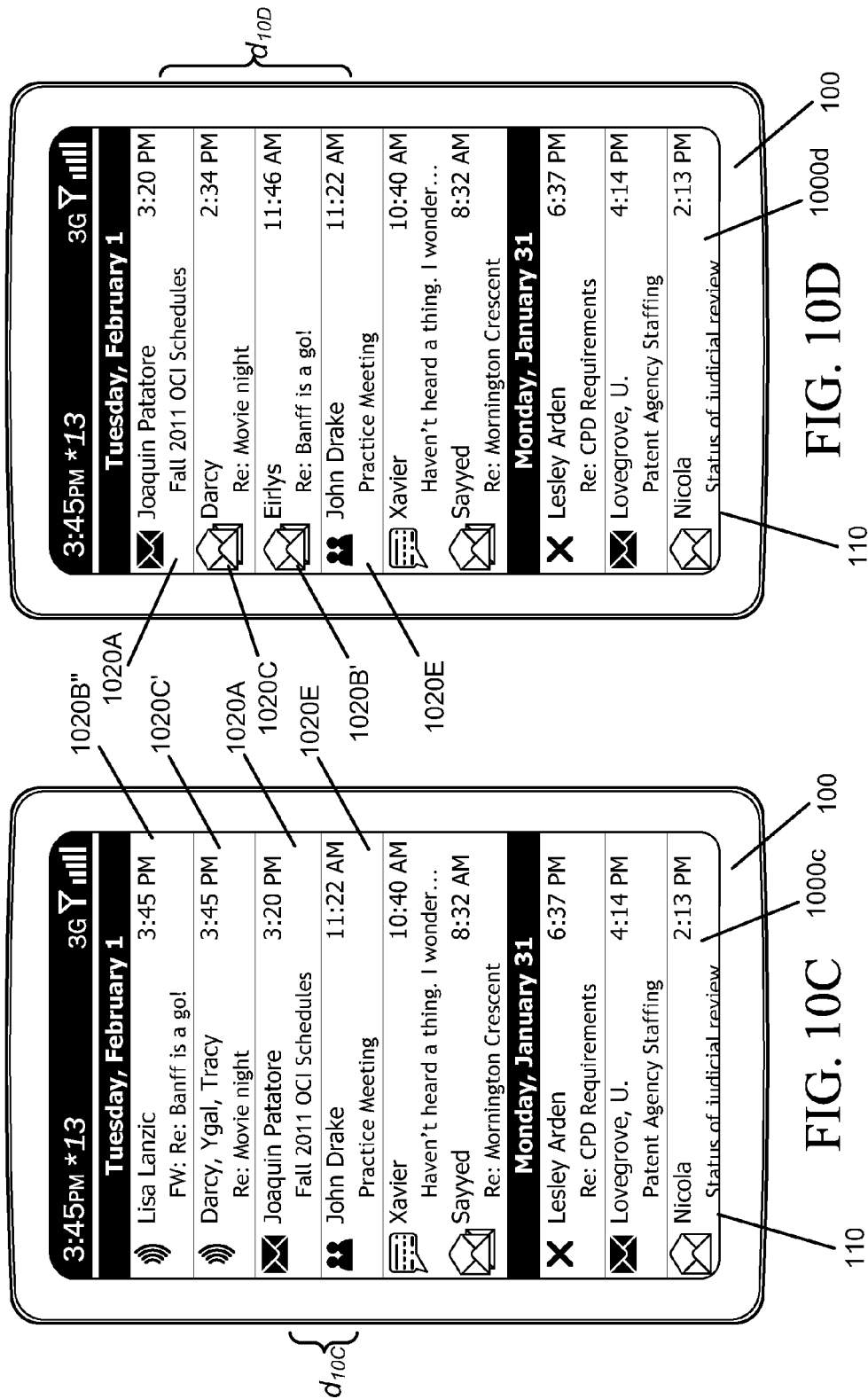

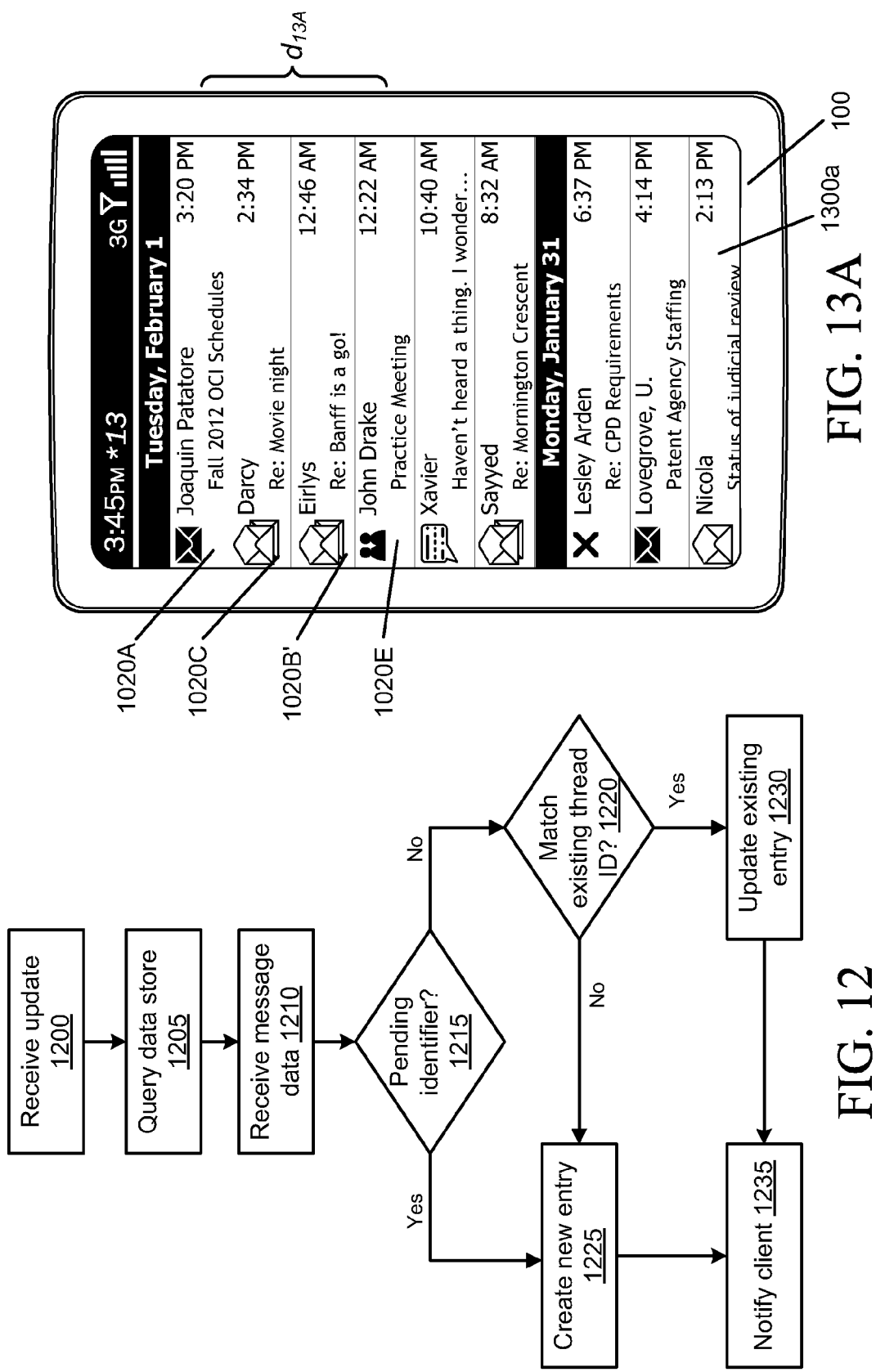

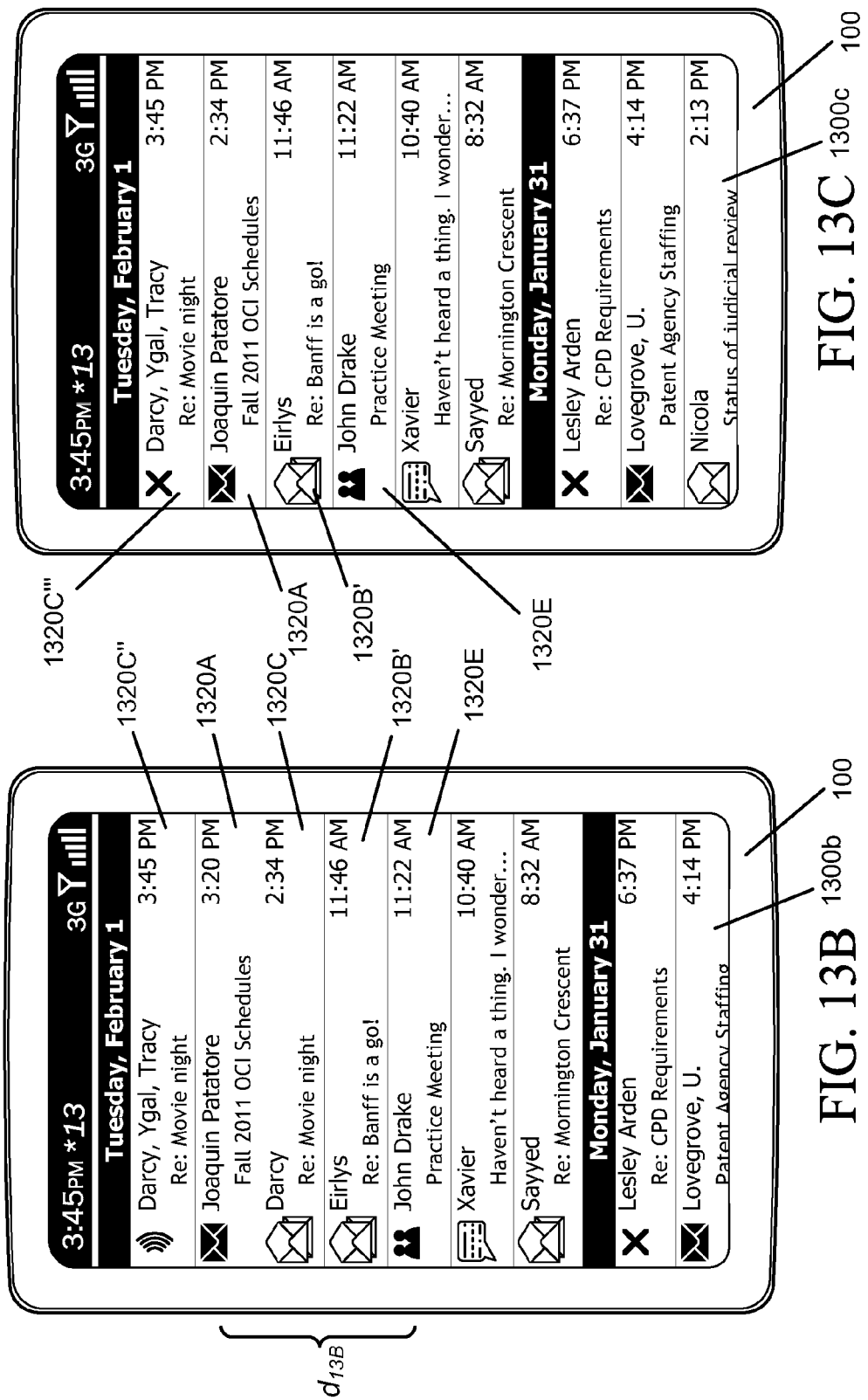

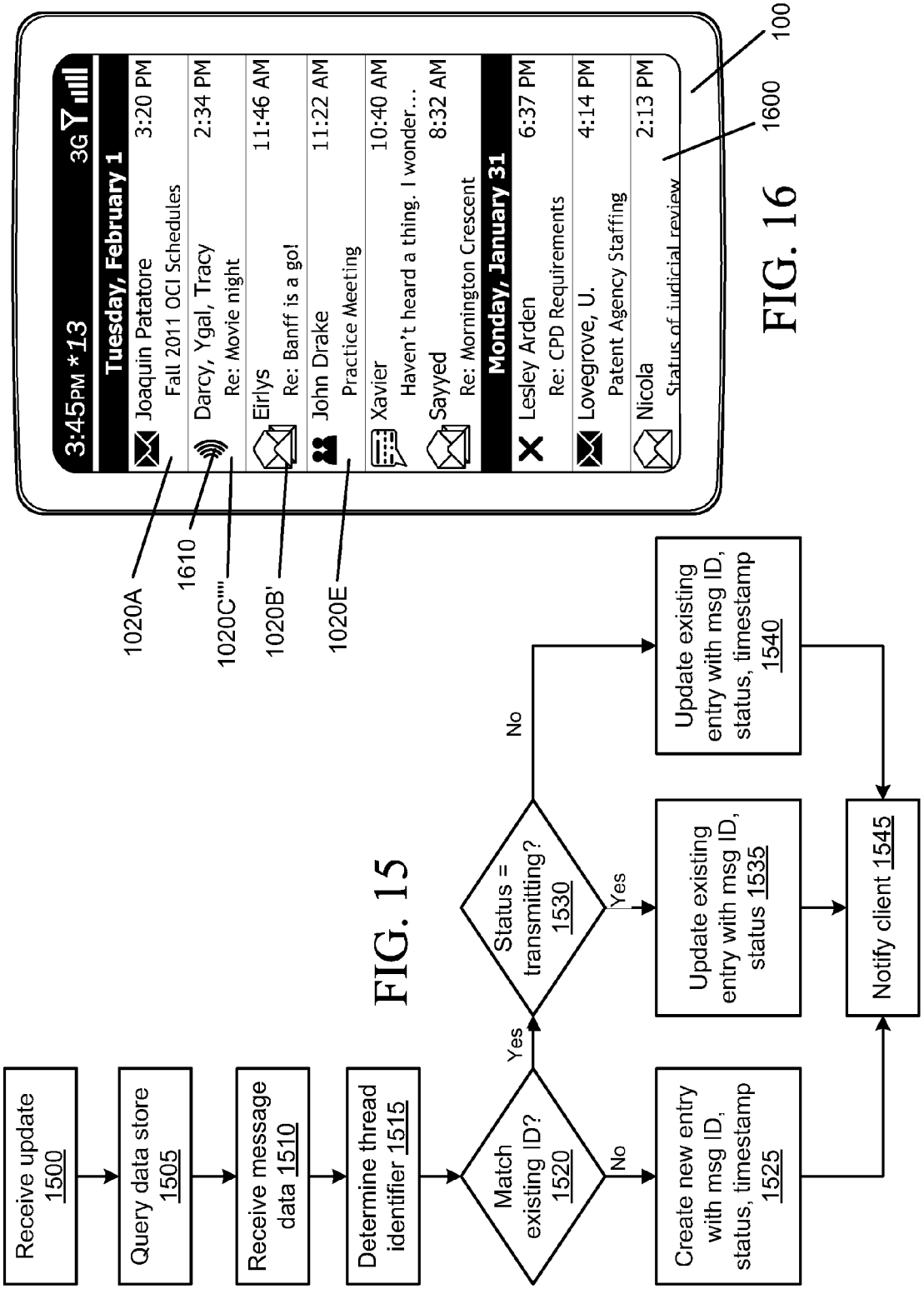

COMMUNICATION DEVICE AND METHOD FOR COHERENT UPDATING OF COLLATED MESSAGE LISTINGS

CROSS-REFERENCE TO RELATED APPLICATION

This application is a continuation of U.S. application Ser. No. 13/025,822, filed Feb. 11, 2011, now U.S. Pat. No. 8,375,400, which is entirely incorporated by reference herein.

BACKGROUND

1. Technical Field

The present application relates generally to a communication device and method for filtering, grouping and collation of messages in a communication device display.

2. Description of the Related Art

A messaging client executing on a user communication device typically presents an ordered listing of messages to the user, collated according to one or more criteria such as message timestamp, subject line, thread or conversation membership, or other message attributes. Such ordered listings can be presented visually via a communication device display, or by other user-perceptible means such as audible announcements. Messages stored and available for presentation at the communication device can include both received and sent messages, as well as messages associated with a variety of different accounts and having different formats such as e-mail, SMS, MMS, instant messages (server-based or peer-to-peer), and the like. Consequently, a single user interface display listing messages or message threads drawn from this collection of messages may be cluttered and may include references to certain types of messages that the user is not interested in reviewing. Accordingly, a filter may be employed to screen out certain types of messages to reduce the numbers and types of messages that are arranged for display in the message listing.

BRIEF DESCRIPTION OF THE DRAWINGS

In drawings which illustrate by way of example only embodiments of the present application.

FIGS. 6A and 6B are illustrations of a user interface display in states reflecting the process of FIG. 4.

FIGS. 7A and 7B are illustrations of a user interface display in states reflecting the processes of FIGS. 4 and 5.

FIGS. 10A, 10B, 10C and 10D are illustrations of a user interface display in states reflecting the update process of FIG. 9.

FIG. 12 is a flowchart illustrating a further process for message grouping.

FIGS. 13A, 13B and 13C are illustrations of a user interface in states responsive to the flowchart of FIG. 12.

FIG. 15 is a flowchart illustrating a still further process for message grouping.

FIG. 16 is an illustration of a user interface responsive to the flowchart of FIG. 15.

DETAILED DESCRIPTION

Figure 1:
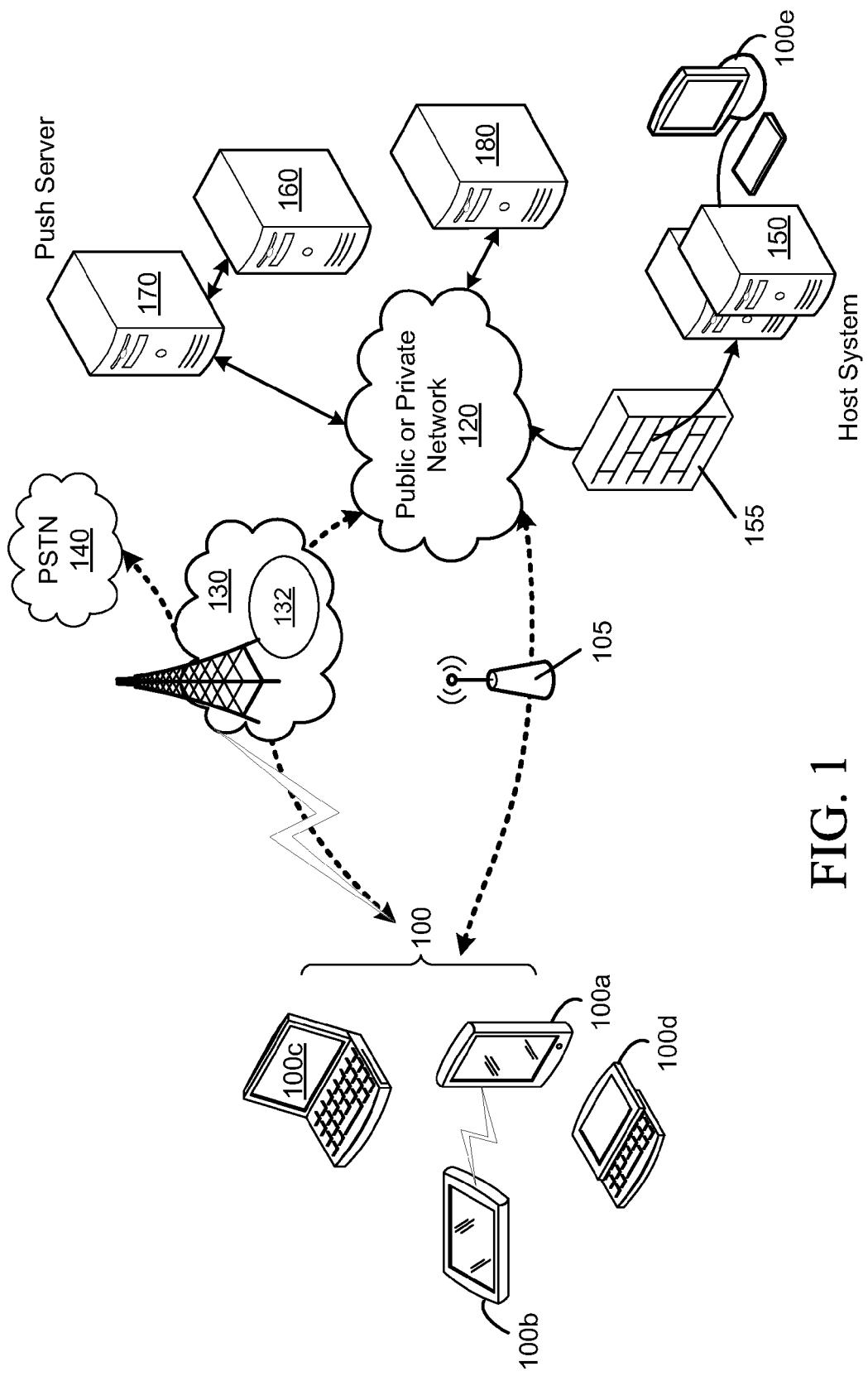
FIG. 1 is a schematic diagram illustrating a network topology for use in messaging with a communication device.

In some communication devices and systems including a messaging client, a message inbox module may acquire messages for display from a filtered collection of messages. The filtered collection of messages in turn is drawn from one or more message stores. The "collection" of messages need not comprise the messages or message objects themselves, but may simply comprise an index for the messages or objects, wherever they are stored. The filters used to define the filtered collection screen messages on one or more criteria. Some criteria are based on "permanent" characteristics or attributes of a message that typically do not change once the message is stored in a message store, such as subject line, sender, or timestamp. Other criteria can be transitory characteristics, such as status. A given message may transition through a number of statuses. For example, an outbound message may transition through two or more statuses such as "draft", "transmitting", "error", and "sent". The "transmitting" status, which indicates that the message is in the process of being transmitted from the communication device, or has been transmitted from the device but no acknowledgement of receipt from a message server has been received, is typically transitory, and resolves as either "error" (if it is determined that message transmission failed) or "sent" (if it is determined that message transmission was successful).

When filtering is based on a value for a message attribute or characteristic that can take on transitory values, a message may first pass through the filter when the message's attribute has that transitory value, but upon an update to that attribute to match the filter value, the message will be suppressed by the filter. Thus, a message inbox display generated from that filtered collection can change when the status of that message is updated, causing the previously-listed message to subsequently disappear from the listing.

In some circumstances, the temporary appearance and subsequent disappearance of the message from the message listing is not problematic for the user or for the operation of the communication device. In other scenarios, the temporary addition of the message to the filtered collection results in processing that may not have been necessary in view of the message's subsequent disappearance. The appearance and disappearance of may adversely affect the coherence of a message inbox listing as list elements automatically appear, disappear, and/or move from place to place within the inbox. This effect may be exacerbated from the user's point of view because the cause of these changes—the transitioning of the message from "transmitting" to "sent", for example—is effectively beyond the user's control.

Therefore, the embodiments described herein provide a computing or communication device, service and method providing an improved presentation of ordered message listings based on a filtered message collection available to the device. These embodiments will be described and illustrated primarily in relation to communication devices, such as wireless communication devices, communicating over wireless networks and public networks. It will be appreciated by those skilled in the art, however, that this description is not intended to limit the scope of the described embodiments to implementation on these particular systems or to wireless devices. For example, the methods and systems described herein may be applied to any appropriate communication device or data processing device adapted to communicate with another communication or data processing device over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the embodiments described herein may be implemented on computing devices adapted for communication or messaging, including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, a computing or communication device may include any such device. The configuration and operation of all such devices generally will be known to those skilled in the art. As another example, the methods and systems described herein are described generally in the context of a client-server system. However, it will be appreciated that this type of architecture is not strictly necessary.

The embodiments herein will be described and illustrated primarily in relation to email and instant messages. However, it will also be appreciated by those skilled in the art that these embodiments extend to other types and formats of messages, including without limitation private messages, SMS (Short Message Service), MMS (Multimedia Messaging Service), VVM (Visual Voicemail), voicemail, and the like. The formatting and transmission of all such messages, storage and indexing of such messages, and the implementation of suitable messaging infrastructures to support such communications, will also be known to those skilled in the art.

For example, email messages and services may be constructed and implemented in accordance with known Internet messaging standards including Internet Message Format RFC 5322 and RFC 2822, published by the Internet Engineering Task Force, as well as their predecessor, successor, and companion standards. Instant messages include network-based and peer-to-peer messages, and such messages and services may be defined in accordance with known standards such as RFC 2779 and RFC 3921 also published by the Internet Engineering Task Force, and their companion, predecessor and successor standards. Point-to-point SMS messages may be implemented in accordance with 3GPP ($3^{rd}$ Generation Partnership Product) Technical Specification 03.40, and optionally extended for transmission of MMS messages as specified by the Open Mobile Alliance Multimedia Messaging Service V1.3, and their companion, predecessor and successor standards. All such messages and services intended for use with the within embodiments may also be defined in accordance with proprietary standards and protocols. Messages may be defined, formatted, and presented using messaging applications implemented on user devices such as the communication devices described above. Such messages are also identifiable by a unique or quasi-unique handle or identifier (ID), implemented within the message format in a suitable location, for example in the header of the message. Messages may be interrelated, for example associated by cross-referencing identifiers, thread identifiers, subject line, or the like, as discussed below. Whether interrelated or not, messages exchanged between a given set of participants (senders and recipients, or originating and recipient or destination devices) may be presented by messaging applications in a conversational paradigm, chronological order, or reverse chronological order, or in any other suitable presentation form or order.

The messages contemplated herein also include other user-generated or computer-generated entities transmitted to a recipient communication device via other types of communication applications or services, such as social applications, data and news feeds, content aggregators, and other utilities. Such entities can include messages or other content transmitted from a sender to a recipient for receipt at his or her communication device in a collaborative or groupware environment. For ease of reference, the embodiments herein are described primarily with reference to messages such as email and instant messages, but are not intended to be exclusive of other message types.

An exemplary network in which the within embodiments may be implemented is illustrated in FIG. 1. A communication device 100 is in communication with various network resources over either a fixed or wireless connection, or both. In FIG. 1, examples of communication devices 100 are illustrated by individual devices 100a through 100e. Devices 100a, 100b, 10c and 100d are generally considered to be mobile devices, easily portable and typically provisioned for wireless communication over a wireless network 130 or via a wireless local area network (WLAN), represented by the access point 105. One or more of these devices, such as the tablet 100b, may not be provisioned for communication over the wireless network 130, but instead may be tethered to another mobile device, such as a smartphone 100a, using a suitable fixed or wireless protocol (such as Bluetooth® or Wi-Fi®) to provide the tablet 100b with connectivity to a shared network infrastructure 120 such as a service provider network or the public Internet via a broadband backhaul. The tablet device 100b, however, may also be capable of directly accessing the WLAN.

The network topology of FIG. 1 includes paths for both data and voice traffic, and includes a host system 150. This latter system is typically a local area network (LAN), but can also be a home office computer or some other private or quasi-private system, for example a subscription-based Internet service. Typically, a number of communication devices 100 can communicate wirelessly with the host system 150 through one or more nodes 132 of the wireless network 130. In this exemplary embodiment, the communication device 100 communicates with the host system 150 via the wireless network 130 and the shared network infrastructure 120. Access to the host system 150 can be provided through one or more routers (not shown), and computing devices of the host system 150 can operate from behind a firewall or proxy server 155. A proxy server provides a secure node and a wireless internet gateway for the host system 150 and intelligently routes data to the correct destination server within the host system 150.

The host system 150 comprises a number of network components, not shown, connected to each other by a network. Within the system 150, for example, user (including administrator) computers may be situated on a LAN connection, and one or more of these desktop computers can be provided with connection facilities for loading information (e.g. PIM data, private symmetric encryption keys to facilitate secure communications) from the user computer to the communication device 100, and can be particularly useful for bulk information updates often performed in initializing the communication device 100 for use. To facilitate the operation of the communication device 100 and the wireless communication of messages and message-related data between the communication device 100 and components of the host system 150, a number of wireless communication support components are provided within the system 150 (not shown). In some implementations, the wireless communication support components can include one or more data stores, a message management server, a mobile data server, a web server, such as Hypertext Transfer Protocol (HTTP) server, a contact server, and a device manager module including an information technology policy server and editor. Other components can also be included as is well known to those skilled in the art. A fifth exemplary communication device 100e is illustrated in FIG. 1 having a fixed connection to the host system 150. This communication device 100e may be a desktop computer or workstation connected via a local area network to the host system 150.

The communication device 100's access to IP networks and to a public switched telephone network (PSTN) 140, if applicable, can be provided through the wireless network 130 in accordance with a suitable mobile telephony standard. In turn, the wireless network 130 provides the communication device 100 with connectivity to the Internet or other public wide area network 120, and thence to the host system 150. At the same time, if the communication device 100 is a multiple-mode device, it may also communicate with the host system 150 over a LAN or WLAN, or indeed by different access means, such as an access point located at the communication device user's home, or at a public or private Wi-Fi hotspot.

One or more online services 160, 170, 180 are accessible over the network 120 by the communication devices 100a though 100e or by other user devices, not shown in FIG. 1. These services may include messaging services supporting different modes of communication such as IM, email, and other types of communication types mentioned above. These messaging services may include infrastructure and equipment for receipt, storage, and forwarding of messages over the network 120. These services may also provide the user with web access to their respective message stores or with other access to request and download copies of messages from their messages stores to a communication device 100, although in some embodiments messages are automatically delivered by the service to the communication device 100 in a "push" paradigm. For example, service 160 communicates (optionally over the public network 120, although not illustrated) with a push server 170, which in turn automatically forwards received messages or notifications of received messages to the communication device over the network 120. A push service may also be provided within the host system 150, although such a push service will generally deliver push content only to subscriber devices 100 registered with the host system.

A single communication device 100 may be provisioned for a single or for multiple messaging accounts and be configured to employ one or more messaging formats. For example, the user may wish to access multiple services operating over the same or different networks to send and receive messages in different formats, which may include, without limiting the scope of such services, email, IM, SMS, MMS, voicemail, and VVM and the like, or multiple services providing messages in the same communication format. For example, the user may wish to access at the communication device 100 email messages received by a user account maintained by the user's host system 150, as well as email messages received by an account provided by a third party service provider. The user may also wish to access messages provided by other messaging or analogous services such as the online services 160, 170 and 180. Similarly, messages in these one or more formats may be composed and sent from the communication device 100 using one or more of the multiple services.

Messages received and/or generated at the communication device 100 can be stored in non-volatile storage at the device 100 either in a single data store or multiple data stores. Typically, messages associated with different accounts, services and/or formats are stored in distinct data stores, folders or files at the device 100. For example, each message item received or generated at the device 100 in association with a given service (such as email) can be stored as a separate message or data object in a data store associated with the service, retrievable for presentation to the user using a dedicated application executing at the device 100 and associated with that particular message, service, or content format. In addition, the message objects may be indexed for retrieval on the device 100 either through the dedicated application itself, through a unified search process implemented in the device operating system, or through another application or process for presentation of message listings or content for multiple accounts, services or formats.

An example of this latter type of application is a "unified inbox" or "unified message box", which is configured to present to the user a message listing display that can be considered to be a global message or content list. For clarity, will be appreciated by those skilled in the art that the term "unified inbox", unless stated otherwise, is intended to be inclusive of an application providing message listings that can include references not only to received messages, but also to messages originating and/or transmitted from the communication device 100, drafts, and other messages that are not received at the device or stored in received message folder or inbox data store. The unified inbox thus provides a unified view of message information that serves as an entry point for access to individual messaging services or individual messaging applications associated with each of the message types included in the unified inbox. The message or content elements displayed in the unified inbox display may include, in the case of messages such as e-mail, header data such as sender, timestamp, and subject line. In addition, or alternatively, at least a portion of the message body content may also be displayed in the unified inbox. In the case of other message types, such as instant messages, the information displayed may include message body content in place of message header content.

Another example of such an application is a home screen application or module such as a "today" screen, which may be displayed on the communication device display as a default screen, upon initialization of the device 100, or upon initialization of a personal information management (PIM) application. The home screen or today screen can display an abbreviated listing of recently received messages for one or more different message formats or accounts. Typically, the message information displayed in a home screen or today screen is sparser than a full message inbox display (such as the unified inbox display), since the message information may share screen real estate with other content such as icons for accessing different applications, device status icons, and other PIM data such as calendar events. When one of these types of applications providing a message listing is invoked, relevant data for inclusion in the listing can be retrieved by a collector process (described in further detail below) from the one or more data stores or folders available to the device 100.

Figure 2:
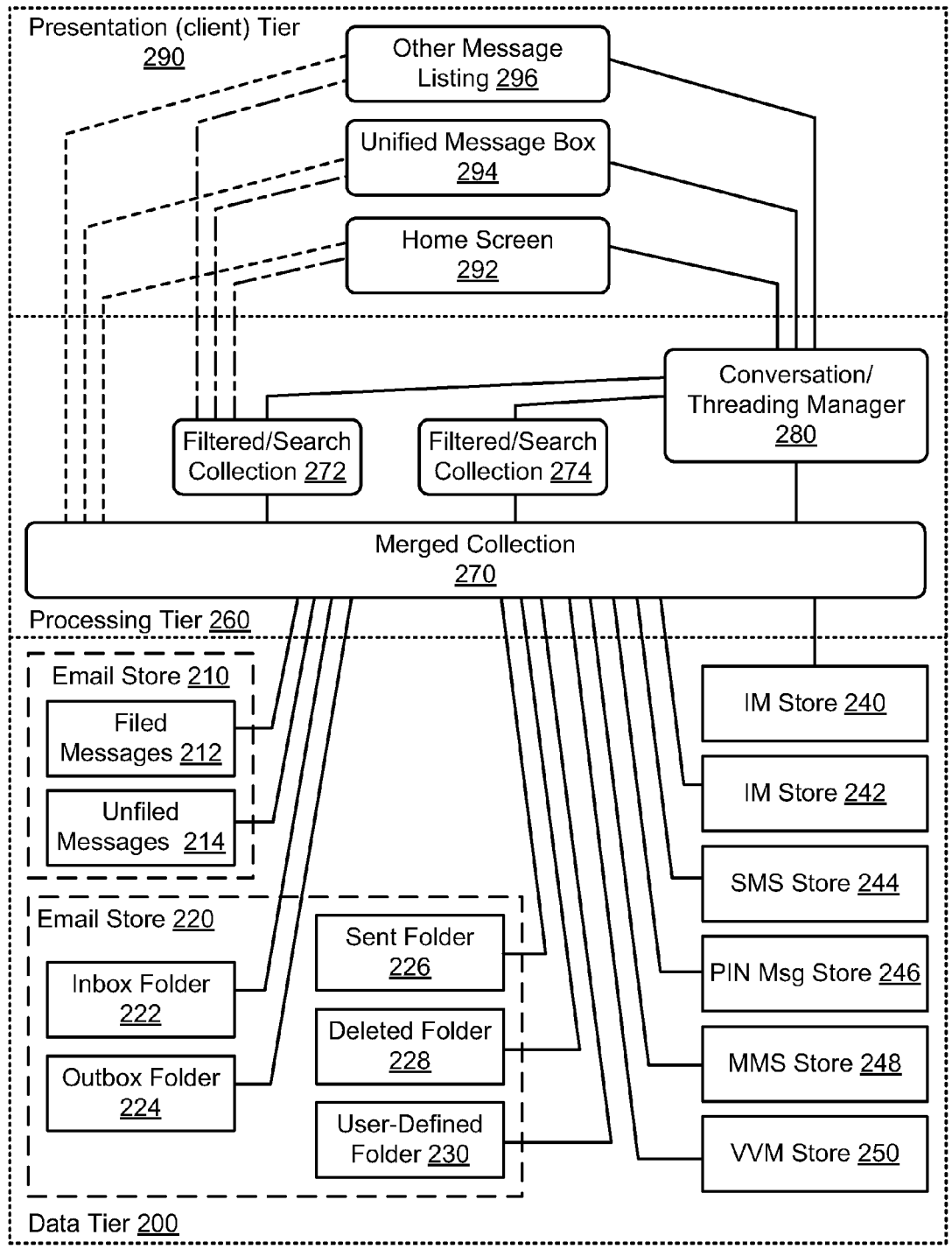
FIG. 2 is a schematic diagram illustrating data, processing and presentation tiers for implementation with the network and device of FIG. 1.

FIG. 2 provides a more detailed illustration of a possible arrangement of message data stores, which may be maintained at the communication device 100, or at a remote location accessible to the communication device 100. In the case of a mobile communication device, message data stores are typically maintained at the device itself, although the data stores at the device may represent only a portion of the complete message data stored in association with a given messaging account. Complete data stores may also be maintained at a remote location, such as a message server in the host system 150. In FIG. 2, the data accessible to the device 100 is provided in a number of distinct data stores, including first and second email stores 210, 220, first and second IM stores 240, 242, an SMS store 244, PIN message (messages addressed using a personal identification number rather than an email address or telephone number) store 246, MMS store 248, and VVM store 250. Messages of various formats may be stored as objects in their corresponding data store. Multiple data stores for a given type of message format, such as the email stores 210, 220 and the IM stores 240, 242 may be associated with different user accounts or different services. Further, messages may be stored in virtual "folders" within a given message store, as illustrated for the email stores 210, 220. The first email store 210 includes two folders, one for "filed" messages 212 and one for "unfiled" messages 214. "Filed" messages are those that the user has chosen to save in a specific subfolder, either at the communication device 100 or in a remote data store, such as in the host system 150. Allocation of a message to a folder may be made by setting a flag or other attribute value associated with the message; thus, a message is "filed" if a flag or attribute defining a folder is set. The remaining messages in the email store 210 that are not "filed" are thus unfiled messages 214. The second email store 220 includes an inbox folder 222, which may be a default folder specified for all incoming messages received at the communication device 100 or at an online service or at the host system 150 on behalf of a user account the communication device 100; a sent folder 226, which may be another default folder specified for all messages sent successfully from the communication device 100, or sent on behalf of a user account associated with the communication device; an outbox folder 224, another default folder specified for all messages in the process of being transmitted from the communication device 100; a deleted folder 228 specified for those messages marked for deletion; and other user-defined folders.

The message data stores include not only the message data itself (i.e., the message header and the message payload or content), but also ancillary information about the message such as metadata, including select message attributes. Some metadata may be provided within the header of the message. Other metadata, such as current status of the message, internal message and thread identifiers (which may be different from message-ID, thread-ID or other message or in-reply-to values inserted into a message header for delivery), flags and timestamps, may be generated at the communication device 100 and stored in association with the message upon receipt of the message or upon initial storage of the message in a communication device message store, and are not necessarily delivered with the message itself when the message is sent. These various metadata elements, even if not received or transmitted with the message, may be considered to be attributes of the message or the message object.

Flags or status values may include values set by a message server, communication device, or sender, such as flags indicating attributes such as an importance or priority level (typically set by the sender of a message), flags representing labels or tags assigned to a message (which may be set manually by a recipient or automatically by a communication device upon receipt), and flags representing common message states such as "read", "new", "recent", "draft", "transmitting" or "pending", "draft", "deleted" and "error". The meanings of such states will be known to those skilled in the art, and as those skilled in the art will appreciate, these states are not intended to be limited by a single literal meaning. The existence of a flag or status value associated with a given message may imply that its converse does not apply; for example, if a message is marked "read", it is not "unread" or "new", and thus it is not necessary to set a status value or flag indicating that the message "unread" or "new".

Select attributes may transition through a series of values during the life cycle of a message, either in direct response to a user action or automatically in response to external or automated events, without requiring direct user action. For example, when a message is received at the communication device 100, it may be stored in its corresponding data store 210 . . . 250 with a flag or status value indicating that it is "new". When the message is accessed and read by the user, the "new" status value is deleted, and a new status value of "read" is stored with the message. This updating of the message status is thus carried out in response to the user's actions. As another example, when a message composed at the communication device 100 is initially transmitted over the network 120 for delivery to a recipient, it may be stored in its corresponding data store 210 . . . 250 with a "transmitting" status value or flag, indicating that the message is in the process of being transmitted from the communication device 100, but no confirmation of successful transmission has been received. The "transmitting" status may be equivalent to a "pending" status, in that the status of the message is temporary pending a change to a more persistent status. This status may also be referred to as an "outbox" status, as the device's queue for outbound messages for transmission may be known as or represented by an outbox folder. The "transmitting" status is typically applied to the message as a result of a user action in invoking a "send" command to initiate transmission of a message from the device 100 to one or more recipients. When the communication device 100 receives confirmation from the network that the transmitted message has been successfully received by a network node, such as a server or router for forwarding on to the addressee, the communication device 100 then automatically updates the status of the message, removing the "transmitting" value and adding a "sent" value. Although the transmission of the message was initiated in response to a user action, the updating of the status from "transmitting" to "sent" was carried out automatically in response to the confirmation that the message was successfully received by the server, router, or other node.

The various messages stores 210 through 250 illustrated in FIG. 2 may be maintained on the communication device 100 itself, although in some embodiments certain message stores may be maintained in a location remote to the communication device 100, and the communication device 100 may only store header and other metadata and attribute information locally. When access to message content is required, the communication device 100 requests a copy of the message for download to the communication device. Even where the communication device 100 routinely stores message content, the messages stored in the various stores may not be complete. As a memory conservation technique, for example, only portions of received messages may be stored at the communication device 100 while the messages in their entirety are stored remotely at a server accessible to the communication device (for example, at the host system 150). The remote store may be configured to synchronize some or all of its message store contents, including message attributes such as flags and status values, with the communication device 100.

The various message stores 210 . . . 250, whether they are maintained at the communication device 100 and/or at a remote location, comprise a set of data sources that may be directly accessed from the communication device 100 and processed in diverse ways for customized presentation using a client application, such as the aforementioned home screen or unified inbox, as represented by the home screen application 292, unified message box application 294, and other message listing applications 296 in the presentation or client tier 290. Typically, an individual client application 292, 294 or 296 may register as a listener for each store 210 . . . 250 of interest, and receive notifications from each store 210 . . . 250 upon a change (such as storage of a new message in the message store or an update to the status of an existing message). This may result in a large number of listeners registered for each message store 210 . . . 250, and requires the client application 292, 294 or 296 to identify and register with each store of interest.

Thus, a processing tier 260 is logically interposed between the data tier 200 and presentation or client tier 290 for aggregating, filtering, searching and classifying message objects. For convenience, a merged message collection object 270 is defined to create an aggregate master index of references for any messages stored in one of the message stores 210 . . . 250. An example of such an object is identified in commonly-owned U.S. Pat. No. 7,568,011, issued Jul. 28, 2009, the entirety of which is incorporated herein by reference. Briefly, an instance of a merged message collection class serves as a message aggregating object which registers as a listener with one or more of the various message stores 210 . . . 250 and/or folders within these stores, as illustrated by the lines connecting the merged message collection object 270 with the various stores and/or folders. When the object 270 is registered with each of the stores and/or folders, each such store and/or folder returns to the merged message collection object 270 an index of references to each of the messages contained in that store and/or folder. The references returned by each folder may exclude items marked for deletion. The index may comprise message references, which may be internal reference identifiers generated for association with the message when stored in one of the data stores 210 . . . 250 or reference values derived from message identifiers received in the message's header. The index may also include metadata relating to the message, such as its status, timestamp, or a timestamp representing the time the message was added to the index, or the last time entry corresponding to that message reference was changed in the index. The merged message collection object 270 aggregates these indices to define an aggregated or merged collection of messages, and may then provide a master index of references to the message objects contained in the various stores and/or folders. A client application 292, 294, 296 may then register as a listener with the merged message collection object 270, as indicated by the dashed lines in FIG. 2. In response to this registration, the merged message collection object 270 returns to the application 292, 294, 296 its aggregated index of messages. The client application 292, 294, 296 may then use the aggregated index to identify and retrieve message data directly from one of the data stores 210 . . . 250, and to generate message listing displays using techniques known in the art.

Each time the content of one of the stores and/or folders with which the merged message collection object 270 is registered changes, the store and/or folder provides a notification event message to the merged message collection object 270. A change may comprise the addition of a new message object due to receipt of a new message at the communication device 100; addition of a new message object due to the creation of a new message for transmission from the communication device 100; or a change in status or a flag value due to a manual or automatic action (such as a message transitioning from a "transmitting" to a "sent" state, as described above). The merged message collection object 270 then updates its own aggregated index to reflect the change, and notifies its registered listeners of the update. Thus, the client application 292, 294, 296 receives update notifications from the merged message collection object 270 about the change to the merged collection.

Not every message contained in the aggregated index may be relevant to the user or for the individual client application 292, 294, 296. Accordingly, the processing tier 260 may also include one or more filter or search collection objects 272, 274, which are defined with reference to one or more filter criteria to define a filtered collection of messages. The filter collection object 272, 274 registers as a listener with the merged message collection object 270, and receives notifications when the aggregated index changes (by addition or removal of a message or a change to a message status). Optionally, the filter collection object 272, 274 may register directly with one or more of the data stores of the data tier 200, and receive notification from the data stores when a change is detected.

The filter criteria may comprise particular values of specific message attributes or header values. One example of a filter criterion, which will be discussed further below, is a status attribute of the message having a value equal to or corresponding to "sent"—in other words, the filter object 272 or 274 will filter out any message that has a status of "sent", while permitting messages with that have any other status value not including "sent" to pass through the filter and form part of a filtered collection, represented by a filtered index. Another example of a filter criterion is a predetermined priority value, such as an importance flag, or a message sender or recipient identity.

As generally used herein, the filter operates to exclude messages that have an attribute value matching the defined filter value from the filtered index created by the filter. In the example above, the "sent" filter suppresses messages with a "sent" status so they are not added to the index. It will be appreciated by those skilled in the art, however, that the filter may operate to pass messages meeting the filter criteria so they are included in the filter list. For example, the filter criterion above may be defined instead as "NOT 'sent'", and the filter may be configured to pass through any messages that meet this criterion, with the result that the filtered collection, again, will exclude messages with a "sent" status. The filter criteria may be configurable by the user or an administrator.

Figures 11A, 11B:
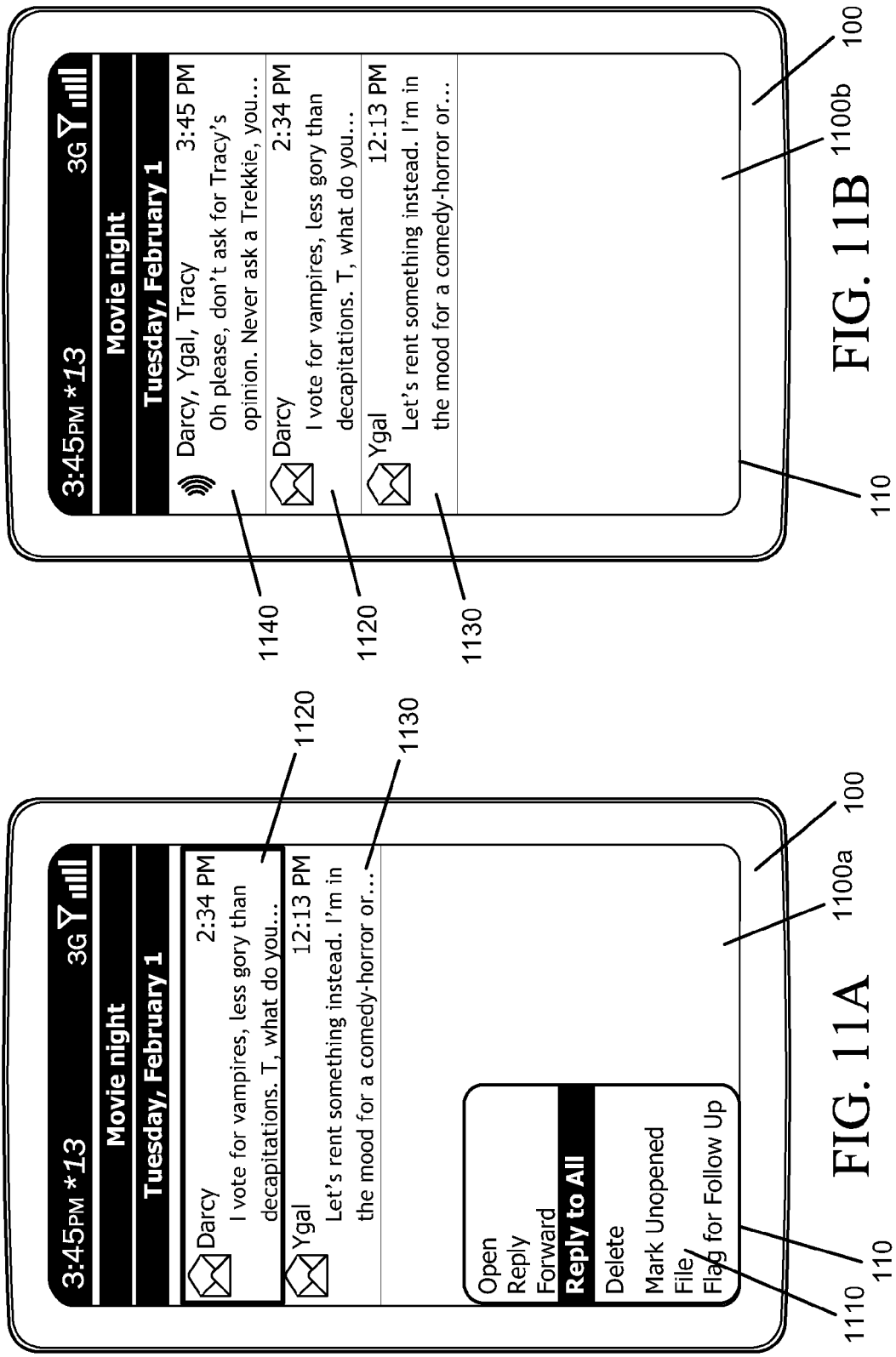
FIGS. 11A and 11B are illustrations of a user interface display in states reflecting the update process of FIG. 9.

Messages are often presented in a messaging application or a unified inbox in a "conversation" or "threaded" mode, in which messages identified as belonging to a common thread are grouped together and presented in a message listing view as a single entry. Accessing these single entries may then invoke a further message list view in which the messages identified as belonging to that thread are displayed. Examples of the first message listing view and the further message list view are shown in FIGS. 7A and 11A, which are discussed in further detail below. The categorization or grouping of messages may be carried out using a variety of different rules and heuristics. A simple method of categorizing messages as belonging to a single "thread" is to assign all messages containing the same subject line (after excluding prefixes and tokens such as "Re:", "Fw:", and other strings denoting that a message is a reply or forward of a previously received message) to one thread. Another method of grouping parent and child (i.e., reply and forward) email messages together in a thread is to determine whether messages are linked through an In-Reply-To value included in the message header, since the value would identify at least the immediately previous message in the message thread. Threads defined in these manner or in a similar manner may be referred to as "conversations", since it is presumed that the messages are linked through common topics, as is typical of oral conversation.

However, the term "thread" is used herein to refer not only to specific groups or subcollections of messages that are determined to be related with each other through common topics or through assignment of a common thread identifier or other common token, but also to groups or subcollections of messages that are determined to be related with each other through other specifically defined common message characteristics or attributes. Messages that include a specific, predefined string of characters in their subject or body (for example, all messages that contain "Banff" in the subject or body) may be determined to belong to a single group or thread, or all messages identifying the same group of addresses or contacts in its header (whether they are identified in a To:, Cc: or From: line) may be determined to belong to a single group or thread. Membership in a thread may be established by defining and storing a thread identifier in association with each message for later retrieval; however, in some embodiments, no express thread identifier may be set, and instead the message threads or groupings are determined by executing a search on the unthreaded message collection.

Determination of thread membership may be carried out by the client application 292, 294, 296 based on the message collection it accesses from the data stores 210 . . . 250, the aggregate index of messages received from the merged message collection object 270, or from a filtered collection obtained from the filter collection object 280. The threading function is thus integrated with the client application. The threading function need not be integrated with the client application, and may instead be carried out by a separate module at the communication device 100. These options are represented by the conversation or threading manager 280 depicted in the processing tier 260 of FIG. 2. The operation of the threading manager 280 is described in further detail below. The threading manager 280 may directly register with individual message stores 210 . . . 250 to obtain message updates, but may also register with the merged message collection object 270 or the filter collection object 272, 274, and make user of the aggregated index or filtered index to classify messages into threads or other related categories. The clients 292, 294, 296 of the data tier may thus register with the threading manager to obtain grouped or threaded message listings for display in an inbox or other message listing display.

By logically segregating the processing tier 260 from the client tier 290 and the data tier 200, different modules or engines may be provided and can operate in tandem to provide messaging and other clients with access to filtered, grouped, threaded or aggregated message content without requiring the messaging client to integrate additional functionality (such as filtering or threading). For example, a third-party filtering application may be installed on the communication device for use with the native data stores 210 . . . 250 and/or native client applications 292, 294, 296 already provided on the device and integrated with the device operating system, or a third-party client application may be installed for use with a native filtered or search collection object 272, 274 or threading manager 280, or a third-party threading manager may be provided for use with existing client applications 292, 294, 296.

Communication flow between the various components of the data tier 200, processing tier 260, and client tier 290 are described with reference to FIG. 3. The merged message collection object 270 is initialized by registering as a listener with each data store 210 through 250 or folder of interest, as indicated by arrow 300. In response to the registration, a message index 305 is returned from each data store or folder to the merged message collection object 270. The merged message collection object 270 then creates its aggregated message index.

When a filter collection object 272, 274 is initialized, the filter collection object 272, 274 registers with the merged message collection object 270 as a listener at 310, and in response receives the aggregated index 315 from the merged message collection object 270. Typically, an instance of the filter collection object is not created until the filtering criteria for that object is defined. The definition of the filtering criteria may be carried out in response to a user or administrator action (for example, the activation of a "hide sent messages" option in a messaging client application may create an instance of a filter collection object 272 associated with a filter criterion of "message status='sent'").

When the filter collection object 272, 274 receives the aggregated index, initial processing is carried out to generate a filtered index. To generate the filtered index, the filter collection object 272, 274 queries 325 the appropriate message data store for message data necessary to make a determination whether the message meets the defined filtering criteria. The scope of the query initiated by the filter collection object 272, 274 is typically defined by the filter criteria defined for the object 272, 274. For example, a filter criterion based on a message header value does not necessitate retrieval of a message body, so the query may only request the message header from the message store. A filter criterion based only on a message attribute such as status value does not necessitate retrieval of the message body or of the message header, but only those required attribute values. However, if the criterion is defined as the header or message body containing a predefined string, then retrieval of the header or body will be required. The requested message data is returned from the data store at 330.

Figure 4:
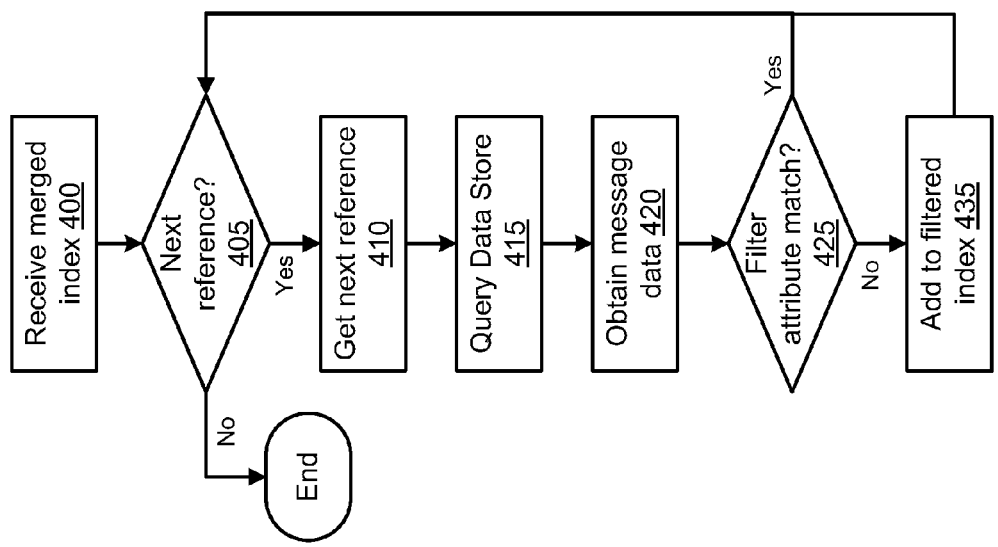
FIG. 4 is a flowchart depicting a process for filtering messages at a communication device.

Turning briefly to FIG. 4, an example of a process of generating a filtered index is illustrated. At 400, the aggregated index is received. At 405, the index is traversed. If there are no further entries in the index, the process ends. Otherwise, the next message reference is obtained from the aggregated index at 410 and the appropriate message store is queried at 415 for the relevant attributes or characteristics of the corresponding message object.

At 420, the requested data is obtained from the message store. At 425, it is determined whether there is a match between the requested message attribute or characteristic and the filter criterion. If so, the message is to be filtered (i.e., excluded from the filtered index), and the process returns to 405 for the next message reference in the aggregated index. If there is no match, then the message reference from the aggregated index is included in the filtered index at 435. The process then returns to 405 for the next message reference in the aggregated index. Thus, the filter process of FIG. 4 operates to exclude messages that match the defined filter criteria, but as noted above, the filter criteria may be defined as permissive criteria (for example, defining that "message status='new'" means that messages having the status value "new" are passed through and added to the filtered index).

Returning to FIG. 3, once the filter collection object 272, 274 is initially defined, a client application 292, 294, 296 may register as a listener for that object 272, 274. The registration of the client application with the filter collection object 272, 274 may occur asynchronously with regard to the generation of the filtered index; for example, the client application may register with the filter collection object 272, 274 before the initial filtered index is completed. Once the filtered index is created, it is provided at 335 to the listening client application. The client application may then process the filtered index to generate a message listing display.

Figure 3:
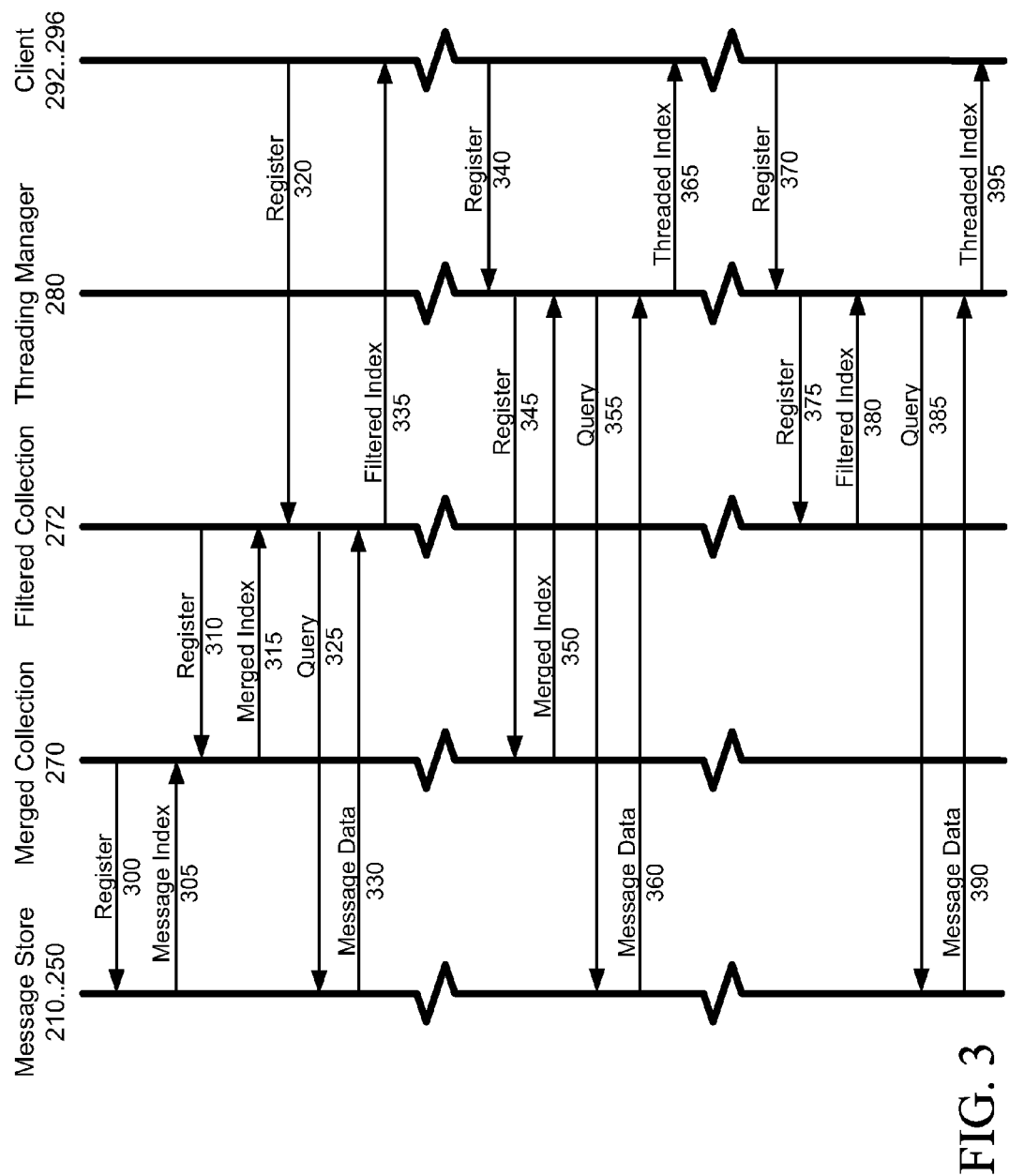
FIG. 3 is a communication diagram illustrating data flow between components of the tiers of FIG. 2 during initialization.

FIG. 3 also illustrates alternate processes by which the client application 292, 294, 296 obtains a message index. For example, the client application 292, 294, 296 may not register with the filter collection object 272, 274 directly, but instead registers with the threading manager 280 to retrieve an index of grouped or threaded messages rather than an ungrouped, unthreaded message index from either the filter collection object 272, 274, merged message collection object 270, or a data store 210 . . . 250. Thus, at 340, the client application 292, 294, 296 registers with the threading manager 280. The threading manager 280 initializes its threaded index of messages by registering as a listener with the merged message collection object 270 at 345. In response to the registration, the merged message collection object 270 provides the merged index 350 to the threading manager 270. The threading manager 280 then generates a threaded index of messages derived from the merged index, querying for 355 and receiving from 360 the message store 210 . . . 250 message attributes or criteria required to determine membership of a given message to a thread. An initial threaded index of messages based on the merged index is then generated by the threading manager 280, and provided 365 to the client 292, 294, 296 in response to its registration at 340. It will be appreciated by those skilled in the art that the registration of the client application 292, 294, 296 need not precede the registration process initiated by the threading manager 280 or the generation of the thread index as illustrated in FIG. 3. However, if no clients are registered with the threading manager 280, the threading manager 280 may deregister with the merged message collection object 270 since no listeners require updates from the threading manager 280, and may only register with the merged message collection object 270 only upon determining that at least one listener has registered with it.

Figure 5:
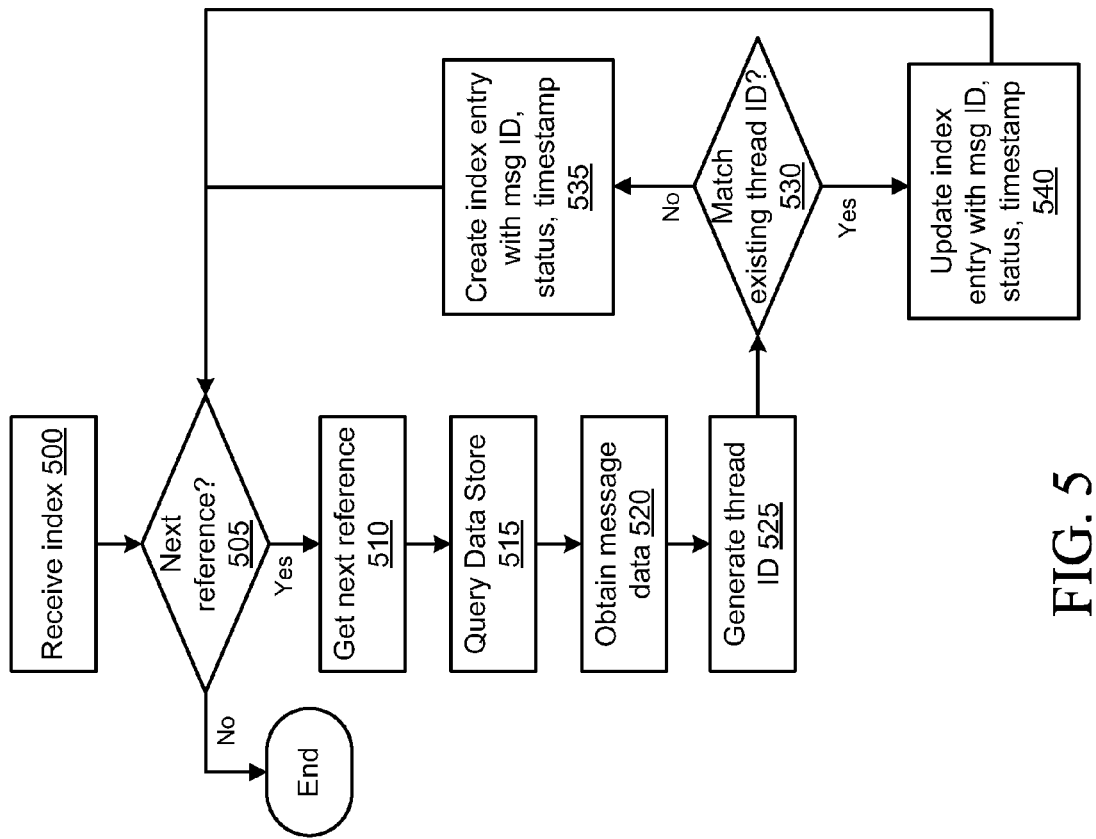
FIG. 5 is a flowchart illustrating a process for message grouping or threading at a communication device.

Different methods of defining a message "thread" or "conversation", and methods of determining whether a given message belongs to a particular thread or conversation and to construct a message thread or conversation listing for display, are within the knowledge of the person skilled in the art. Examples are provided in commonly-owned U.S. patent application Ser. No. 12/966,077, "Management and Display of Grouped Messages on a Communication Device", filed Dec. 13, 2010, the entirety of which is incorporated herein by reference. Turning to FIG. 5, an example of one process that may be employed to generate an initial threaded index from the merged index is illustrated. At 500, the index is received. At 505, the process begins traversal of the index. If there are no further entries in the received index, then the process ends. Otherwise, the next message reference in the index is retrieved at 510 and the appropriate message store is queried at 515 for the relevant attributes or characteristics of the corresponding message object. The relevant attributes or characteristics are defined generally by the methodology used to determine thread membership. Thus, for example, if a thread identifier for a message is computed from a subject line and an account identifier for the message, then this information is requested from the message store 210 . . . 250. In addition, other message attributes of the message object may be obtained that are used in defining a threaded index entry, such as the message's status and timestamp. In particular, the value for the thread identifier may be determined in part based on the current status of the message. For a message that is "pending" or "transmitting", which is an intermediate status for an outbound message that is in the process of being transmitted from the communication device 100 over either wireless or fixed connection, a pending identifier value may be assigned to the message rather than a thread identifier, since as explained below the message's status is in a state of transition. The pending identifier is a value that is sufficiently unique so as to be distinct from existing or possible thread identifiers defined for other messages based on message attributes.

Typically, the computed thread identifier or pending identifier is generated at or around the time the message is stored in the message store 210 . . . 250; this may be upon receipt of an incoming message over a wireless network or shortly thereafter, for example. As another example, generation of the thread identifier may take place upon storage of a message generated at the communication device 100 (i.e., an outgoing message), or upon transmission of the message. The threading manager 280 may receive notification of the new incoming or outgoing message (by "new" in this context, it is meant that the message did not previously exist in a message store at the device 100 in its present status, as opposed to a message that is expressly flagged with a "new" status attribute) and either assign the pending identifier or compute the thread identifier based on the message's attributes and characteristics in a background process. In some embodiments, however, the thread or pending identifier may not have been generated at the time of storage of the message, and may be assigned or computed at a later time when the identifier is required.

At 520, the requested data is obtained from the message store and the thread identifier determined at 525 if it was not already available. A table of thread entries correlating one or more messages to a thread identifier may be generated and stored by the threading manager 280 for internal reference. At 530, it is determined whether the generated thread identifier matches an existing thread identifier already present in the table. If not, then a new table entry is created, identifying the thread by its assigned or computed thread identifier and referencing the messages that belong to the thread by a message identifier. The table may also store attributes for the thread such as a thread timestamp, based on the timestamp of the most recent message that is a member of the thread, and a thread status collectively representing the status of the member messages of the thread. For example, if the message object inspected had a timestamp of Feb. 1, 2011 at 11:46 AM and a message status of "read", then the newly-created thread will bear the same timestamp, since it is the most recent timestamp associated with the thread (references to "timestamp" herein generally refer to a string denoting both a date or time associated with the message object or thread rather than a time or date alone). The thread may also be assigned a status based on the value of the status attribute retrieved for that message object; thus, for example, this thread may be marked as "read" since all messages currently associated with the thread have been "read". The table may also store optional metadata such as each message's timestamp, status, and other attributes. The process then returns to 505.

If the computed thread identifier matches an existing thread identifier, then at 540 the existing table entry is updated using the message identifier, message status, and timestamp or other relevant information. If the thread timestamp is updated, it is compared with a current timestamp of the thread. If the timestamp of the current message object is more recent than the current timestamp of the thread, then the current timestamp of the entry is updated to the timestamp of the message object. Thus, for example, if the message object having the timestamp of Feb. 1, 2011 at 11:46 AM described above was determined to belong to an existing thread having a current timestamp of Jan. 27, 2011 at 10:23 AM, then the existing thread will be updated to add a reference to the newer message object, and to alter the timestamp of the thread to Feb. 1, 2011, 11:46 AM. If, however, the existing thread had a timestamp of Feb. 1, 2011 at 2:56 PM, then the timestamp of the thread would not be updated, although a reference to the message object would still be added. Further, the status of the thread, if stored in the table, may be updated to reflect the additional information represented by the current message object's status. If the status of the thread was already "read", and the current message object was also "read", then no change would be made; however, if the current message object was "unread", then the status of the thread may be changed to "unread" to reflect the fact that there is unread content referenced in that thread. Since the status of the thread may be referenced by the client 292, 294, 296 and used to select appropriate status icons for display in a user interface, updating of the status in this manner will permit the client 292, 294, 296 to alert the user to possible unread message content in a message thread. Finally, the process returns to 505 to process a next reference in the merged index.

The threading manager 280 may also generate a threaded index of messages that may also be used by clients 292, 294, 296 to construct listings of message threads for display. The threaded index may comprise an entry for each message reference identified to the threading manager 280 by its message source (which may be the filtered index, aggregate index, or even the data stores themselves) comprising the message's corresponding thread identifier as appropriate. Optionally, the threaded index entry may include other metadata or attributes for the message as mentioned above. Thus, the threaded index will identify, for each message identified, a corresponding thread identifier if one is available, or alternatively the pending identifier for the message if applicable. As changes are detected to the status of a message or to other attributes of the message that affect the value of the thread identifier or pending identifier, the threaded index is updated accordingly to reflect the changed values.

In an alternate embodiment, the thread identifier, if applicable, is generated at the time the message is stored in its corresponding data store 210 . . . 250 or its status is updated and stored in the corresponding data store. However, if the message is in an intermediate state (such as a "pending" or "transmitting" message), no separate identifier (whether a pending identifier or thread identifier) is assigned to the message. Thus, when a threaded index entry is created for such an intermediate message, the entry will merely identify the message reference, but not include any thread or pending identifier for that message.

Changes of the types described above—the creation of a new thread entry, the updating of an existing thread entry to reflect a new timestamp and/or addition of a message reference and/or a change of thread status—comprise examples of notifiable changes that are provided in update notifications to listeners registered with the threading manager 280.

The foregoing examples described with reference to FIG. 3 illustrated the provision of a filtered index to a client application 292, 294, 296 and provision of a threaded index to the client application. Returning again to FIG. 3, another alternative initialization method is described for providing a filtered, threaded index to the client application 292, 294, 296. Again, the client 292, 294, 296 initially registers with the threading manager 280 at 370. The threading manager 280, rather than registering with the merged message collection object 270, registers with the filter collection object 272, 274 at 375, and receives in response from the filter collection object the filtered index at 380. The threading manager 280 then generates a threaded index, generally as described above including the process of FIG. 5, querying the message data stores 210 . . . 250 as necessary at 385, and receiving message data in response at 390, to generate the index. At 395, the threaded index is provided to the registered client application 292, 294, 296.

As noted above, although the embodiments herein refer to a "threading manager", messages need not be classified according to a "thread" as generally understood in the art, as a collection of one or more messages pertaining to a single topic, generally as determined by a message subject line or by message content. The threading manager 280 may be configured to group messages in a different manner, such as by subject, by addressee or addressee groups, by priority or importance (either as defined explicitly by a flag or other message attribute, or as computed based on content and heuristics), and by other express or implicit message characteristics and attributes. In these embodiments, message "threads" may equally be considered to be message "groups" or "collections", wherein membership in a given group or collection is determined by a message attribute or characteristic shared by the member messages and not by other messages within the merged index or filtered index used as a source for the threading manager 280. The threading manager 280 may thus be considered to be a "grouping" or "collection" manager.

FIGS. 6A, 6B, 7A and 7B provide exemplary results of the processes described above as they may be depicted in a unified message box or unified inbox. The examples of user interface displays illustrated herein are drawn from a representative set of message headers set out in Table 1 below for ease of reference:

TABLE 1

| Index | Type | Attribute | Date | Time | Subject |
|---|---|---|---|---|---|
| a | email | unread | 1 Feb 2011 | 3:20 PM | Fall 2011 OCI Schedules |
| b | email | sent | 1 Feb 2011 | 2:56 PM | Re: Banff is a go! |
| c | email | read | 1 Feb 2011 | 2:34 PM | Re: Movie night |
| d | email | sent | 1 Feb 2011 | 2:15 PM | FW: Re: Mornington Crescent |
| e | email | read | 1 Feb 2011 | 11:46 AM | Re: Banff is a go! |
| f | email | unread | 1 Feb 2011 | 11:22 AM | Practice Meeting |
| g | IM | read | 1 Feb 2011 | 10:40 AM | |
| h | IM | sent | 1 Feb 2011 | 10:03 AM | |
| i | email | read | 1 Feb 2011 | 8:32 AM | Re: Mornington Crescent |
| j | email | error | 31 Jan 2011 | 6:37 PM | Re: CPD Requirements |
| k | email | read | 31 Jan 2011 | 4:29 PM | CPD Requirements |
| l | email | unread | 31 Jan 2011 | 4:14 PM | Patent Agency Staffing |
| m | email | read | 31 Jan 2011 | 2:13 PM | Status of judicial review |
| n | email | read | 31 Jan 2011 | 12:13 PM | Movie night |
| o | email | sent | 31 Jan 2011 | 10:01 AM | Mornington Crescent |
| p | email | sent | 27 Jan 2011 | 10:23 AM | Banff is a go! |

Table 1 lists a series of sixteen messages in reverse chronological order, consisting of two types (email and IM). In this table and the following tables, the index for a given message or thread provided in the table corresponds to the suffix applied to the reference numeral for the listed message or thread in the corresponding figures. FIG. 6A illustrates a first user interface 600a depicting a reverse chronological listing of single messages, displayed in a display 110 of a typical communication device 100 such as a tablet or smartphone. This listing includes messages of any status, which as can be seen in Table 1 include "sent", "received" and "error" messages. In FIG. 6A, the user interface 600a lists the first six messages of Table 1, indicated as 610a through 610f, the most recent IM message 610g, and the ninth and tenth messages 610i and 610j. In some embodiments, since IM messages are typically brief messages in a continuing chat or conversation, the client 292, 294, 296 may be configured to only retrieve and display the most recent message in the chat.

These messages are displayed in reverse chronological order, together with header information including sender (or recipient, in the case of a sent message), subject line, and timestamp. In addition, the single message listings are each accompanied with an icon graphically indicating a current status of the message; in this example, received and unread messages (i.e., messages not marked "read") are indicated by an unopened envelope 620; sent messages (i.e., messages successfully transmitted from the communication device 100 to at least a first server or router en route to a recipient, although not necessarily successfully received by the recipient) are indicated by a check mark 622; messages comprising calendar items as attachments are denoted by a specialized meeting icon 626; IM messages from a chat are denoted by a speech bubble 628; and messages marked with an error status, typically as a result of a detected error in an attempt to transmit the message from the communication device 100, are denoted by an X 630. This user interface 600a is thus an example of a message listing constructed by a client application 294 provided with an unfiltered, merged index from the merged message collection object 270.

FIG. 6B illustrates messages displayed by the same client application 294 as they may be retrieved based on a filtered index received from the filter collection object 272, 274, generally as described above with regard to the first example of FIG. 3. In this example, a filter criterion of a message status of "sent" has been defined (i.e., "sent" messages are to be excluded from the filtered index). Thus, the user interface 600b of FIG. 6B excludes the two sent messages 610b, 610d depicted in FIG. 6A, and instead lists the first message of Table 1, indicated as 610a, as well as messages 610c, 610e, 610f, 610g, 610i, and 610j originally shown in FIG. 6A. In addition, two other messages 610k and 610l, representing the eleventh and twelfth messages of Table 1, are visible in the user interface 600b in view of the omission of messages 610b and 610d. The user interface view 600b thus reduces some potential clutter in the display due to sent messages, which the user may not wish to view in a message listing display.

FIG. 7A illustrates a further view of a client application 294 where the listing of messages in the user interface 700a is derived from a threaded or grouped index of messages received from the threading manager 280 as in the second example of FIG. 3. When a client application generates a message group or message thread listing, it may use the threaded index generated by the threading manager 280 to construct a set of message thread listing entries by traversing the threaded index to identify all messages corresponding to each thread identifier, and to determine message thread attributes for the listing entry such as status and timestamp based on the individual timestamps and statuses of messages that are identified as members of that thread. If the threaded index includes messages associated with a pending identifier or no identifier, those messages may be treated as single entries for inclusion in the message thread listing, and the message's attributes of timestamp and status will be the timestamp and status used for the listing entry. Thus, the client application may construct a table or other representation for each message thread and intermediate message identified for inclusion in the message thread listing in a manner similar to that described with respect to the threading manager 280 above. Alternatively, if the threading manager 280 constructs the table of thread entries that identifies message membership for each thread or pending identifier, status information and timestamp information for each thread, the client application may simply use the table generated by the threading manager 280. The client application can then collate the message thread listing entries according to a selected collation criterion, such as listing entry timestamp or another attribute of the entries, and generate a view for display on the communication device 100.

In the example of FIG. 7A, message threads or groups are classified according to root subject line (omitting prefixes such as "Re:" and "Fw:", and the like), and a timestamp and status for the thread are defined as generally discussed above in regard to FIG. 5. It can be seen from Table 1 that message a in Table 1 is therefore the only member of its own message thread, while messages b, e and p are members of another thread. Based on the foregoing method, the messages of Table 1 may be grouped into message threads as shown in Table 2:

TABLE 2

| Index | Type | Last Status | Date | Time | Last Subject |
|---|---|---|---|---|---|
| A | email | unread | 1 Feb 2011 | 3:20 PM | Fall 2011 OCI Schedules |
| B | email | read | 1 Feb 2011 | 2:56 PM | Re: Banff is a go! |
| C | email | read | 1 Feb 2011 | 2:34 PM | Re: Movie night |
| D | email | read | 1 Feb 2011 | 2:15 PM | FW: Re: Mornington Crescent |
| E | email | unread | 1 Feb 2011 | 11:22 AM | Practice Meeting |
| F | IM | read | 1 Feb 2011 | 10:40 AM | |
| G | email | error | 31 Jan 2011 | 6:37 PM | Re: CPD Requirements |
| H | email | unread | 31 Jan 2011 | 4:14 PM | Patent Agency Staffing |
| I | email | read | 31 Jan 2011 | 2:13 PM | Status of judicial review |

Since the last message sent in thread B of Table 2 was dated Feb. 1, 2011 at 2:56 PM (as indicated in Table 1), the timestamp of thread B has that value. However, in this example the last status of thread B does not match the last status of the message in the thread, message b of Table 1. In this example, when the most recent message in the thread is a sent message, its status is ignored for the purpose of updating the message thread's status. Since the previous messages in thread B were marked as "read" the last status of thread B is therefore "read" as well. If one of the earlier messages in the thread had been "unread", then the last status of the message thread B may instead be "unread", to draw the user's attention to the fact that the thread contains unread content.

Thus, in FIG. 7A, a threaded index comprising information such as the information set out in Table 2, together with references to the individual message objects belonging to each thread, is provided to the client application 294, which then constructs the user interface display 700a listing the threads 710A through 710I drawn from Table 2, here listed in reverse chronological order.

FIG. 7B illustrates a further message thread or group listing in a user interface 700b, this time derived from a filtered, threaded index provided by the threading manager 280 to the client application 294, in accordance with the third example of FIG. 3. In this example, messages are again filtered to exclude messages having a status of "sent" as in FIG. 6B. Because membership in a message thread is derived only from the filtered list, the threaded index entries will vary from those set out in Table 2 where the sent messages affected the last status, timestamp or subject of the thread. Table 3 sets out the message threads that may result from such a filtered index, again listed in reverse chronological order, and including indices matching the indices in Table 2 where the entries are unchanged:

TABLE 3

| Index | Type | Last Status | Date | Time | Last Subject |
|---|---|---|---|---|---|
| A | email | unread | 1 Feb 2011 | 3:20 PM | Fall 2011 OCI Schedules |
| C | email | read | 1 Feb 2011 | 2:34 PM | Re: Movie night |
| B' | email | read | 1 Feb 2011 | 11:46 AM | Re: Banff is a go! |
| E | email | unread | 1 Feb 2011 | 11:22 AM | Practice Meeting |
| F | IM | read | 1 Feb 2011 | 10:40 AM | |
| D' | email | read | 1 Feb 2011 | 8:32 AM | Re: Mornington Crescent |
| G | email | error | 31 Jan 2011 | 6:37 PM | Re: CPD Requirements |
| H | email | unread | 31 Jan 2011 | 4:14 PM | Patent Agency Staffing |
| I | email | read | 31 Jan 2011 | 2:13 PM | Status of judicial review |

It can be seen that as a result of the exclusion of the "sent" messages, the timestamps of both threads B and D of Table 2 have changed, as represented by threads B' and D' of Table 3. The latest messages in the threads B' and D' are no longer "sent" messages, but are now older received messages. Further, in the case of thread D of Table 2, the last subject line has changed from "FW: Re: Mornington Crescent" in Table 2, taken from a "sent" message, to "Re: Mornington Crescent" in Table 3, which was the subject line of the most recently received message. FIG. 7B shows the resultant display of threads 710A, 710C, and 710E through 710I, as well as altered threads 710B' and 710D' based on this threaded index. While similar threads are displayed as in FIG. 7A, their ordering and content is now different.

The foregoing processes and user interfaces reflect the state of a message listing display or threaded message listing display after a filtered index and/or threaded index is initialized at the communication device 100. As noted above, when changes are detected to a message index—whether the merged index of the merged message collection object 270, the filtered index of the filter collection object 272, 274, or the threaded index of the threading manager 280—update notifications are issued to any processes registered as listeners for that object. Thus, a change to a message data store 210 . . . 250 may result in a cascade of update notifications that ultimately filter through to the client 292, 294, 296, prompting an update of a message listing display in a user interface.

Figure 8:
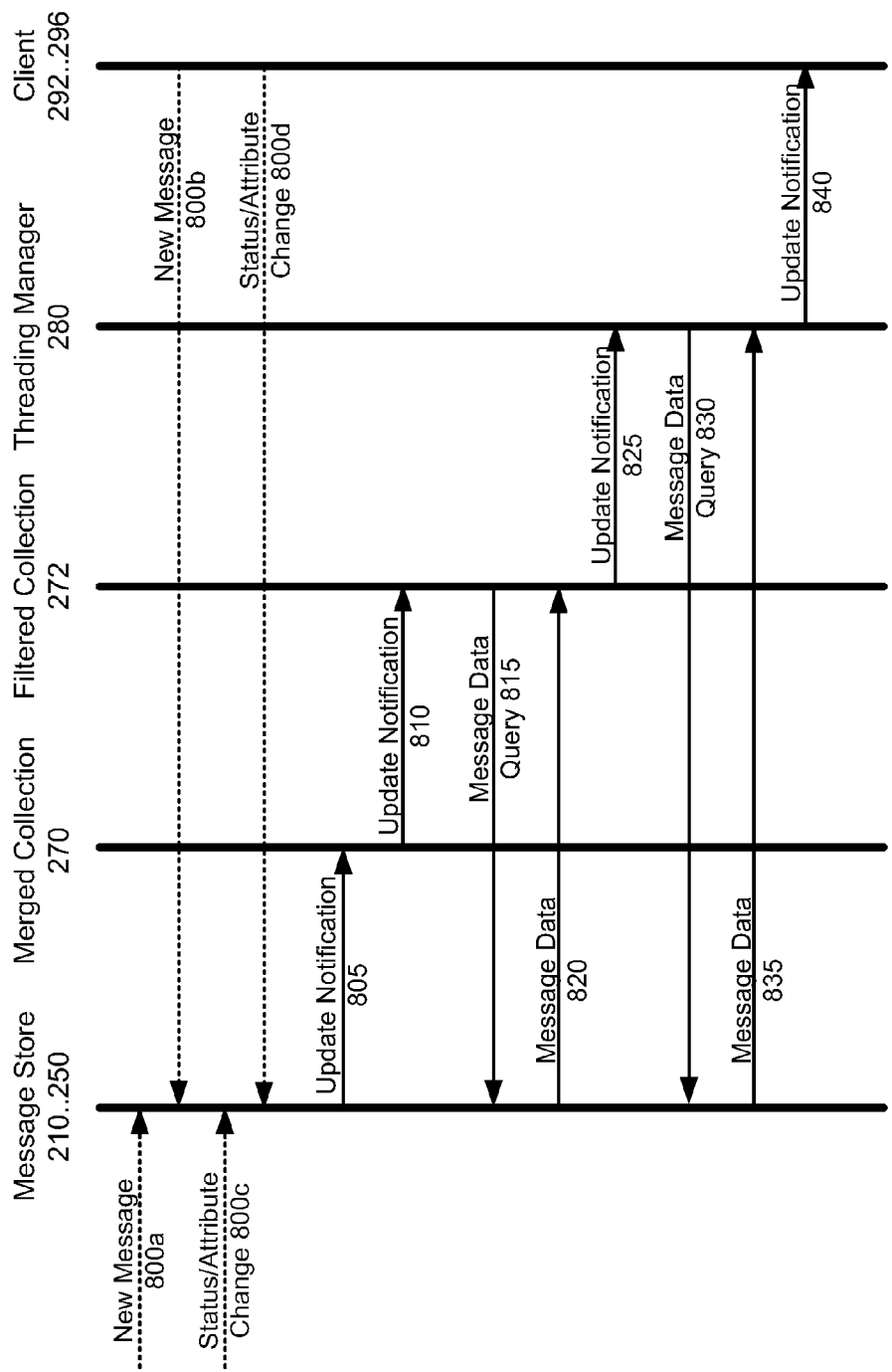
FIG. 8 is a communication diagram illustrating data flow between components of the tiers of FIG. 2 during an update process.

FIG. 8 illustrates this update process where a client 292, 294, 296 is registered with the threading manager 280, which in turn is registered with the filter collection object 272. A change to a message data store 210 . . . 250 is detected initially at 800a, 800b, 800c, or 800d, which illustrate possible scenarios prompting a detected change. For example, a new message may be received in an inbound message queue at the communication device 100, and stored in the appropriate data store 210 . . . 250. Alternatively, a new message may originate from the communication device 100 itself, in the form of a draft message saved to a message store (i.e., a message with a "draft" status), or an outbound message saved to the message store and in the process of being transmitted (i.e., a message with a "transmitting" status). The change may result from a status or attribute change for that message 800c received by the message store 210 . . . 250 from an external source. For example, if the message store is synchronized with or updated using a remote data store and a status of a message was altered at that remote store (e.g., from "unread" or "new" to "read"), a notification may be provided to the communication device's local message store indicating the message identifier and a change in status, which would be recorded in the message store. Similarly, the alteration of status or attribute may originate from the device 100 itself, where the user uses a messaging client to read a message (i.e., changing its status from "unread" or "new" to "read"), altering a subject line in a draft message, and so on. A thread identifier may be assigned to the new message as necessary at this stage, as described above with respect to FIG. 5.

In response to this detected change, an update notification is sent 805 to any registered listeners for that data store, in this case the merged message collection object 270, identifying the nature of the change to the message object. In response to the received update notification, the merged message collection object 270 updates its own aggregated index as necessary, for example removing a message reference if a message was deleted from the data store, adding a new message reference if a new reference was added to the data store, or altering a status for a message already in the aggregated index. The update to the aggregated index is then transmitted at 810 to any listeners registered for the merged message collection object 270, in this case the filter collection object 272.

The filter collection object 272 in turn updates its own filtered index, generally following a similar process as that illustrated in FIG. 4; the filter collection object 272 may query the message store 210 . . . 250 for any pertinent information at 815 to be used in evaluating the changed message object against the filter criteria, and then determines based on the data received at 820 whether the message passes the filter or is excluded by the filter. If the message passes the filter and was not previously included in the filtered index, then it is added to the filtered index. If the message passes the filter and was previously included, then its existing entry in the filtered index is updated to reflect that a change occurred (although the specific change may not be recorded in the filtered index). If the message is now excluded by the filter but was previously included in the filtered index, the filtered index is updated to remove that message reference. An update reflecting any changes to the filtered index is then issued at 825 to any listeners registered with the filter collection object 272, such as the threading manager 280.

The threading manager 280 then undergoes a similar process of updating its threaded index based on the changed information regarding the filtered index. For each change indicated by the filter collection object 272, the threading manager 280 queries the message data store 210 . . . 250 at 830 for any necessary information for recomputing or computing thread membership and status if not already determined for the message. Upon receipt of the required information at 835, the threading manager 280 updates any threads or create new thread entries as necessary. An update notification 840 is then provided to any listeners of the threading manager 280, such as the client 292, 294, 296. The client may then update any user interface displays or other message data it manages accordingly.

Figure 9:
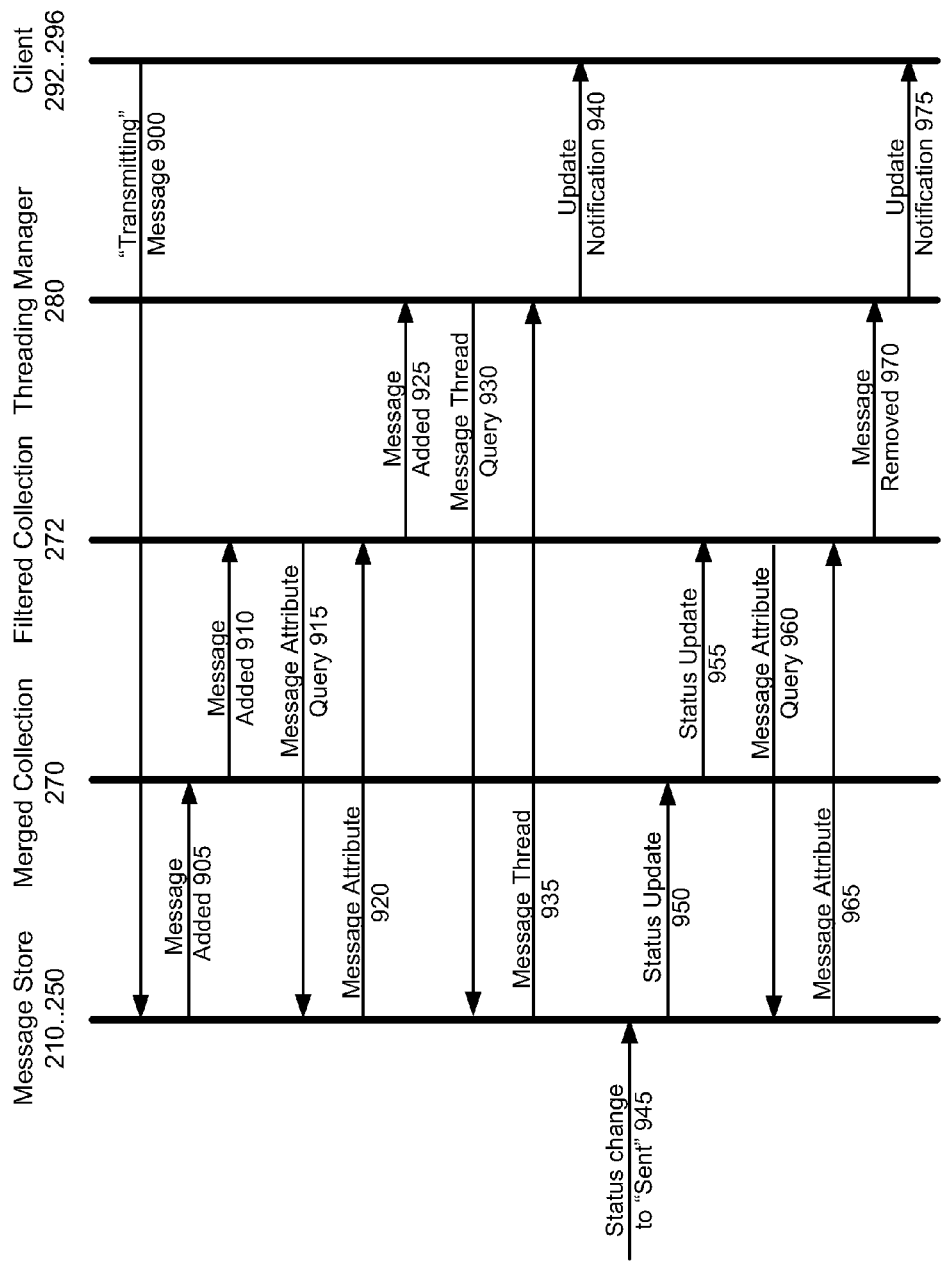
FIG. 9 is a further communication diagram illustrating data flow between components of the tiers of FIG. 2 during an update process.

A specific example of the communication flow of FIG. 8 is illustrated in FIG. 9, specifically for the instance where a message is initially transmitted from the communication device 100, then successfully sent, while the filter collection object 272 is defined with filter criteria that exclude "sent" messages. A message for transmission to a recipient, composed at the communication device 100 using a messaging client, is added to an outbound message queue to await transmission to a message server to be routed to the message addressee, and is initially stored in a message data store such as the email store 210 or 212, for example in the unfiled messages folder 214 of email store 210, or the outbox folder 224 of the email store 220. Because the message is awaiting transmission, it is marked with a "pending" or "transmitting" status, which is an intermediate status of outbound messages that have not yet progressed to the "sent" status. A thread or pending identifier may be assigned to the message at this stage, as described above.

Because the message was thus added to a message data store, a change is detected at the data store and a notification is issued to any listeners registered for that store, such as the merged message collection object 270. The notification 905 indicates to the listener that a message has been added to the data store, and a message identifier is provided. The merged message collection object 270 adds the message to its aggregated index, and alerts its listeners to the change in the aggregated index through a further notification 910, in this case provided to the filter collection object 272. The filter collection object 272 is thus alerted to the addition of a new message to the aggregated index, and must next determine whether the message should be added to the filtered collection. Thus, the filter collection object 272 queries the message data store identified for the message reference, and obtains whichever message attributes or characteristics are needed to filter the message. In this example, the filter collection object 272 requests 915 the status attribute or attributes for the message. The attribute data is provided in a response from the data store 920. In this case, the response 920 will indicate that the message has an attribute of "transmitting" or "pending", but not "sent". Thus, the filter collection object 272, in filtering the message, will determine that there is no match to its predefined filter criterion, and the message is therefore added to the filtered index.

Because there is a change to the filtered index, the filter collection object 272 then notifies any registered listeners with a notification 925, here the threading manager 280, of any changes to the filtered index. In this case the change notified is an addition of a message, and the message reference. The threading manager 280 must then determine if this change to the filtered index necessitates any changes to the threaded index. Thus, a query 930 is issued to the data store for any relevant data required by the threading manager 280 to determine thread membership, such as the previously assigned or computed thread identifier. In other embodiments, the request may be for the message attributes or characteristics required for the threading manager 280 to compute a thread identifier. The requested data is provided in a response 935, and the threading manager 280 determines thread membership of the message if necessary. Regardless whether the message is a member of a pre-existing thread or not, in this example an entry in the threaded index will be created or modified; if created, a new entry identifying the message and its corresponding identifier, whether a pending identifier or thread identifier, may be added to the threaded index, together with other optional metadata as described above. If this is a new thread entry, then the message will be the only message referenced by the thread or pending identifier, and its attributes (e.g., its timestamp, status and subject line) will thereafter be used to define the timestamp, status and subject line attributes of the thread. In this example, the new thread entry will therefore have a status of "pending" or "transmitting" and it will be associated with a pending identifier. If the message is determined to belong to a pre-existing message thread, then that thread entry may be similarly updated in view of the message's attributes. Notification of the updated or new entry in the threaded index is then provided to the client at 940, at which point the client may retrieve additional information from the data store in respect of the message to update a user interface display, or may simply update a user interface display based on the message thread attributes provided in the notification.

Since the message is in the process of being sent, once it is successfully transmitted to a message server and the server acknowledges receipt, the message is removed from the outbound queue and its status is updated in the message data store to reflect that it is no longer "transmitting" or "pending", but is now "sent". The intermediate "transmitting" or "pending" status is thus a transitional or transitory state that may be generally understood to be a precursor or a precondition to a message transitioning to the "sent" status, as any message to be sent from the communication device 100 is, although for only a brief period of time, a "transmitting" or "pending" message. An intermediate status is thus not a persistent status, as the intermediate status will automatically change in view of a subsequent event. Since the message status is updated in the message store as indicated at 945, the message data store issues a status update for that message at 950 to any registered listeners, again including the merged message collection object 270. The merged message collection object 270 in turn updates its aggregated index, and issues a status update notification 955 to any registered listeners such as the filter collection object 272 identifying that a status change was made to the referenced message.

The filter collection object 272, as above, requests 960 and receives 965 message attribute data to determine whether the message passes the defined filter. In this case, however, since the change altered the status attribute from "transmitting" or "pending" to "sent", the attribute value now matches the filter criteria and the filter collection object 272 removes the message from the filtered index. The filter collection object 272 then transmits status updates 970 to any listeners, such as the threading manager 280, that the message has been removed from the filtered index and therefore no longer forms part of the filtered collection.

The threading manager 280 thereafter determines the effect on the threaded index. As the message was previously included in the threaded index, it must now be removed, and an update notification 975 provided to any registered listeners such as the client application, identifying the message or thread and the change effected.

As illustrated in FIGS. 7A and 7B, and in Tables 2 and 3 above, filtering of select messages from the collection of messages identified to the threading manager may result in a change of order of the message threads as they may be displayed or otherwise presented at the communication device 100. In FIGS. 7A and 7B, collated message thread listings were presented in both user interfaces 700a and 700b, organized according to thread timestamp; however, because sent messages were excluded from the message threads listed in FIG. 7B, a different temporal relationship between the threads was implied by the different ordering. The differences in the ordering are to be expected as a result of the exclusion of "sent" messages by the filter collection object 272 in the example of FIG. 7B.

When a message is added to a message store with a transitory attribute value, as in the example of FIG. 9, a correspondingly transitory effect may be experienced by any processes to which the change is cascaded through propagation to the various objects in the processing tier 260. The effect is illustrated in FIGS. 10A through 11B. FIG. 10A illustrates a graphical user interface 1000a which comprises the same message group listing as FIG. 7B, based on a threaded index derived from a filtered index defined on a "hide sent messages" filter. In FIG. 10A, a selected message group listing 1020C is highlighted, and a context menu 1010 invoked. The context menu 1010 includes an option to "reply" or "reply to all", which when invoked in respect of the highlighted thread, invokes a message composition screen (not shown) for entry of message text in a response message addressed to the sender of the most recent message in the thread identified in the listing 1020C (if "reply" is selected), or to all recipients of the most recent message of the thread (if "reply to all is selected). From the message composition screen, a "send" command may be invoked to initiate transmission of the message from the communication device 100. Upon invocation of the "send" command, the user interface display may return to a message listing view, which as discussed below may resemble the user interface illustrated in FIG. 10B.

In the user interface 1000a of FIG. 10A, as with the other examples of user interfaces illustrated herein, the relative position of the various listings 1020A, 1020C, 1020B' and 1020E visually indicates a temporal relationship among the listings since the list items are arranged in a reverse chronological order. If collated according to a different criterion, such as priority, subject, or sender, a different type of relationship would be implied by the spatial relationship of the listings in the display. While the relative distance between listings, such as between 1020A and 1020B' indicated as $d_{10A}$, is not to scale with the actual relative ages of the message threads, the distance between the threads does convey that the third thread 1020B' is somewhat older than the first thread 1020A, but has not aged as much in comparison with the majority of message group listings shown in FIG. 1000a.

Consider the case where the new message is generated at the device 100 and transmitted in response to the second message thread listed, 1020C. As explained with reference to FIG. 9, when this message enters the intermediate "pending" or "transmitting" state, the filtered index and the threaded index may be updated to reflect the introduction of this message to the message data store. Accordingly, following the update process described in FIG. 9, when the "transmitting" message passes the filter and is added to the threaded index by the threading manager 280, the status and other attributes of the thread represented by the listing 1020C will be updated to reflect the "transmitting" status and timestamp of this new message.

Accordingly, after the cascade of notifications and index updates of FIG. 9, the user interface of FIG. 10A will be updated to the condition illustrated in FIG. 10B, in which the user interface 1000b now displays a message listing 1020C' in place of original listing 1020C. Since the "transmitting" message was added to the existing thread and the timestamp updated, and since the message group listing of FIG. 10B is collated according to reverse chronological order, message group listing 1020C' is therefore moved from its original position in FIG. 10A to the top of the display in FIG. 10B. Consequently, the relative difference between the listings 1020A and 1020B' has been altered; the distance between them, $d_{10B}$, is now smaller since they are now adjacent.

While this behaviour of the user interface in FIG. 10B may not appear to be significantly disruptive to the user, the behaviour is more disconcerting once the "transmitting" message's status is updated to "sent", and the message is filtered out of the index used to populate the threaded index. As a result of this automatic updating of the message status, a change will be detected at the message data store and cascaded through the various levels of the processing tier 260 to the client application as described with reference to FIG. 9, and, as will be appreciated by those skilled in the art, the user interface 1000b will revert back to the original form illustrated in FIG. 7B (i.e., the form of FIG. 10A, excluding the context menu 1010). This transition from the user interface 1000a to the second user interface 1000b and back again may last only approximately as long as the time required for the message to be successfully transmitted for notification of a status update to be propagated. The period may be as short as a fraction of a second; however, it is likely perceptible by the user, who very well may be observing the communication device display 110 during the period of time immediately following initiation of the transmission of the message from the device. The user will therefore observe that one or more of the message group listings of the user interface 1000a is apparently "jumping" from place to place in the listing, rendering it more difficult to review the contents of the user interface display during that period.

Disruption to the user interface display may be exacerbated if multiple messages are added at or around the same time with a "transmitting" status. This may occur, for example, when user initiates transmission of more than one message during a period when the communication device 100 has difficulty communicating with the message server or is located in an area with weak signal strength. This is illustrated in FIG. 10C, where in a further user interface 1000c replies to two threads displayed in the message group listing are in the process of being transmitted. Updating these threads results in the movement of thread listing 1020B' to a top position, as thread 1020W', as well as thread listing 1020C to 1020C'. As a result, the original thread listing 1020A is now adjacent to thread listing 1020E as indicated by the distance $d_{10C}$; yet, once the messages have been successfully transmitted and their status updated to "sent", the user interface 1000c will revert to the user interface 1000d illustrated in FIG. 10D, where the first thread listing 1020A is further away from the thread listing 1020E, as indicated by the distance $d_{10D}$. Again, the transition between these different user interfaces is disruptive because it occurs over a short, yet user-perceptible, period of time while the user is likely observing the display. Because the message group listings are moving from place to place in the display with respect to each other, the coherence of the message listing is interrupted while messages are being transmitted from the device.

FIGS. 11A and 11B illustrate a similar effect, in that a "transmitting" message temporarily appears in a message listing and then quickly disappears once it is "sent". FIG. 11A illustrates a first user interface 1100a which may be invoked by selecting the message group listing 1020C of FIG. 10A. The user interface 1100a lists portions of the messages 1020, 1030 in the thread represented by that listing, again in reverse chronological order. Since the messages are drawn from the filtered collection defined by the filter collection object 272, in this example no sent messages are illustrated. As with the example of FIG. 10A, one of the messages in the thread may be selected and a message composition screen invoked through a context menu 1110 to create a reply to that message. Also as with the example of FIGS. 10A and 10B, once that composed message begins transmitting, the relevant message data store will be updated with the transmitting message, and as described above with respect to FIG. 9, the user interface 1000b (illustrated in FIG. 11B) will be updated with a further entry 1140 reflecting the currently transmitting message. Again, this entry 1140 will disappear again once the message is successfully "sent" and is filtered out by the filter collection object 272 before it reaches the threading manager 280.

In the case of FIGS. 11A and 11B, the message listing remains generally coherent since the relative ordering of the previously existing messages within the user interface display 1000a, 1000b is not altered. Nevertheless, it can be seen that additional processing on the part of the threading manager 280 and the client application results from the temporary inclusion of the "transmitting" message in the filtered index and threaded index. Further, the communication device 100 may be configured to issue a user-perceptible alert or notification (which may be visual, such as a flashing LED or the display of an icon on the display screen, audible, or tactile) whenever a change is detected in a particular message thread or to the displayed message group listings. The inclusion of the "transmitting" message, or its automatic removal once the transitory "transmitting" stage is passed, may thus trigger the alert or notification when it is not wanted.

While the filter criteria for the filter collection object 272 or 274 may be adjusted to exclude "transmitting" messages as well as "sent" messages, it may not be desirable to impose this additional processing burden on the filter. In some embodiments, a single filter collection object may be used by a number of client applications or listeners, and one of those client applications may require or be intended to be used with a simple filter (such as one that only filters out messages with a "sent" attribute). Further, one of the client applications obtaining message information from the filter object (whether directly or indirectly) may require access to "transmitting" messages, so blocking them by that filter may not be an option.

Thus, requiring the filter criteria to be redefined to exclude "transmitting" messages as well as "sent" messages so as to address the coherency problem described above would require not only a more complex filtering process, but may also require the establishment of multiple filter collections to handle the requirements of multiple client applications. This increases the complexity of the processing tier 260.

Accordingly, rather than altering the filter criteria or other configuration of the filter collection, the threading manager 280 is configured to defer allocation of a newly detected message or an update to an existing message to its corresponding message thread. This deferral may be invoked directly in response to detecting that the message that is the subject of an update notification has a current status of "transmitting" or another known intermediate attribute. Turning to FIG. 12, an example of a first deferral process is shown. At 1200, the threading manager 280 receives an update notification. As described above, this update may pertain to a message that has been added to the filtered index (or other index provided to the threading manager at the initialization stage, such as the aggregated index), a message included in the filtered index whose status or other attribute has changed, or a message that has been removed from the filtered index. At 1205, upon receipt of the update notification including a message identifier, the threading manager 280 queries a data store as necessary or obtains the thread or pending identifier corresponding to the message, or else queries a data store for any message data required to compute the thread identifier, if necessary.

At 1210, any requested message data is received, and a determination is made at 1215 whether the message is associated with a pending identifier. If it is, then a new threaded index entry is defined for the message using the pending identifier at 1225, as it is not associated with any existing message thread at this stage, even if the message does in fact belong to an existing message thread. This may be the case where a new message is generated and transmitted from the communication device 100 in response to another message stored at the device that forms part of the threaded index; while the new message notionally belongs to the same thread as this earlier message, association of the new message with the existing thread is deferred by establishing an index listing for the message in association with the pending identifier instead. A new entry may be defined for the table maintained by the threading manager 280 as well. Any registered listener, such as the client 292, 294, 296, is then notified of this change to the threaded index as before at 1235.

If the message is not associated with a pending identifier, then it is determined at 1220 whether the thread identifier matches an existing identifier in the threaded index. If not, then a new thread entry is created in the threaded index at 1225, generally as described above. If the thread identifier does match an existing identifier, then at 1230 the existing thread entry is updated with any relevant information for this particular message. For example, if the message was removed from the filtered index, the existing threaded index entry for that message may be removed as well. If the threading manager maintains a record of the messages associated with a given thread identifier, that record may be updated as well to reflect the current status or timestamp of the message thread in view of the change to that message. Again, at 1235, the client is notified of the change to the threaded index.

Although the step of determining whether an identifier is "pending" is illustrated as an express decision step, it will be appreciated by those skilled in the art that this distinct step need not be implemented. Rather the process may simply move from receiving the thread or pending identifier to a determination whether the identifier matches an existing thread identifier, as the pending identifier should be distinct from existing thread identifiers.

Thus, in FIG. 12, the assignment of a computed thread identifier, based on the message subject line or other message attributes or characteristics, is deferred for the "transmitting" message even though the message may well belong to an existing thread. The effect on the display of message group listings may be seen in FIGS. 13A through 13C. FIG. 13A depicts a user interface 1300a similar to that shown in FIG. 10A or 7B, in particular including the message thread listings 1310A, 1310C, 1310B' and 1310E, in reverse chronological order based on their corresponding message thread timestamps. When the "transmitting" message is detected in the message store as described above with reference to FIGS. 10A and 10B and notification of the new message is cascaded to the threading manager 280, the threading manager 280 follows the process of FIG. 12. Since the message has a "transmitting" status, a unique identifier is assigned to the message; it is not associated with any existing thread corresponding to that message's subject (which already exists in the threaded index and is represented by thread listing 1310C).

The threading manager 280 therefore adds a new entry in the threaded index, and notifies the client application of its addition. Accordingly, the user interface 1300a of FIG. 13A may transition to the state illustrated in FIG. 13B, where the client application retrieves any required message data to construct the user interface 1300b, which includes a new message listing at the top (because the listings are arranged in reverse chronological order), 1310C". This new message listing represents the single-message "group" comprising the one "transmitting" message, and has a timestamp corresponding to the transmission time. There still remains in the user interface 1300b the message group listings that were displayed in the previous user interface 1300a, in the same order (1310A, 1310C, 1310B' and 1310E). The new message is thus listed "outside" the conversation or thread to which its parent message belongs. It can be seen that because the original thread listing 1310C is not removed, the spatial relationships between the previous message group listings of the user interface 1300a is preserved; for example, the distance $d_{13A}$ between listings 1310A and 1310E in FIG. 13A is the same as the distance $d_{13B}$ between the same listings in FIG. 13B. In the example of FIGS. 10A and 10B, and FIGS. 10C and 10D, the spatial relationship between two message listings was altered when the "transmitting" message appeared and then disappeared from the display.

It will therefore be appreciated by those skilled in the art that in deferring thread identifier assignment in this manner, coherence of the message group listing in the user interface 1300b is maintained without altering the filter criteria and without altering the message display logic of the client application 292, 294 or 296. Further, the process of FIG. 12 may avoid the need for certain processing steps that may otherwise be undertaken if the message was not a "transmitting" message, as it is not necessary to engage in any comparison of timestamps of multiple messages belonging to the thread in order to determine whether the thread entry is to be updated in the threaded index. Instead, a single-message identifier (the pending identifier) is defined for the "transmitting" message, and the current status and timestamp of that thread may be taken directly from that message's own status and timestamp.

When the message completes transmitting and is updated to a "sent" message status, as described above, the message is then filtered from the filtered index, and a notification is provided to the threading manager 280 indicating the removal of that message from the filtered collection. The threading manager 280 may then identify the message by its reference, identify the corresponding thread entry in the threaded index, and remove the entry from the index. Because the "transmitting" message was the sole member associated with its identifier in the threaded index, the entry may be simply deleted without any impact on the status of any other threads. A notification is then provided by the threading manager 280 to any registered listeners. During this process, the message's pending identifier can also be updated by the threading manager 280 to a computed thread identifier as described above. The update to compute the thread identifier may be carried out upon notification that the message's status has been updated in the message store, or else it may be carried out at a later point once the threading manager 280 determines that the message is to be included in the threaded index, although this may not occur at this stage if the filtered collection is configured to exclude "sent" messages.

If, alternatively, the message transitions from the "transmitting" state to a state other than "sent"—for example, "error"—again, an update to the threaded index may be undertaken to remove the "transmitting" thread and to update the pre-existing thread for that message with the new "error" status. A possible resultant user interface 1300c is shown in FIG. 13C, where it can be seen that while message group listings 1310A, 1310B' and 1310E remain in the display, the listing 1310C has been removed and replaced with an updated listing 1310C''', with an updated timestamp and an updated status.

Figure 14:
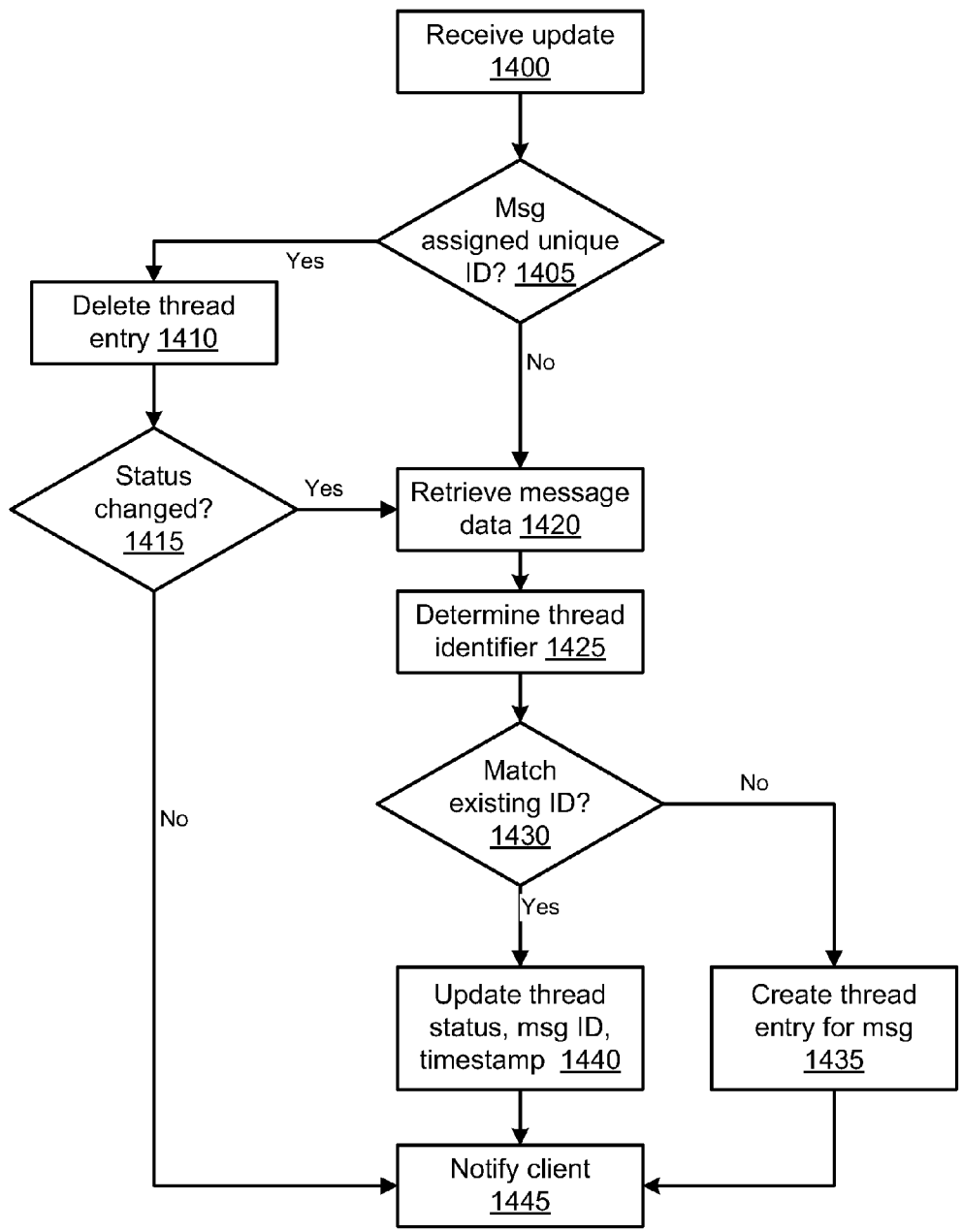
FIG. 14 is a flowchart illustrating a process for removing a message from an index.

Removal of a previously "transmitting" message from the threaded index is illustrated in FIG. 14. At 1400, an update notification is received by the threading manager 280 regarding a message that has been removed from the filtered index, or alternatively that a status of a message that is within the filtered index has been changed. At 1405, it is determined whether the message had been assigned a unique thread identifier by the threading manager 280 rather than a computed thread identifier based on message characteristics or attributes. If it had been assigned a unique identifier, then that thread entry is deleted at 1410 and any clients or listeners are notified of the change at 1445.

If the notification indicated a status change for the message (for example, a change from "transmitting" to "error") as determined at 1415, or if the message had not been assigned a unique identifier distinct from its proper thread identifier, then message data is retrieved as necessary from the message store at 1420 to compute the thread identifier at 1425. If at 1430 it is determined that the identifier matches an existing thread identifier in the threaded index, then at 1440 the existing thread entry is updated as necessary with a new status and/or timestamp and subject line, and the message identifier for the new message is added. If the thread identifier does not match an existing thread, then at 1430 a new thread entry is created for the message with the message's timestamp and status as the thread entry's attributes. Finally, any clients or listeners are notified of the change at 1445. Otherwise, if at 1415 it was determined that the notification was a removal of the message from the filtered collection, then the process simply ends with the notification at 1445.

Although the foregoing process was described in connection with updates to a filtered index, this process may operate for any type of message index used by the threading manager 280 to generate the threaded index. The source index may be the filtered index provided by the filter collection object 272, or it may be the aggregated index provided directly by the merged message collection object 270. The message data source may even be the message data store 210 . . . 250 itself. The threading manager 280 will, in any case, operate to defer the allocation of the "transmitting" message to its corresponding thread, or will defer updating of the timestamp for that thread until such time that the message's status has transitioned to "sent", or at least to a value other than "transmitting". The benefit of the foregoing processes can be readily appreciated where messages identified in filtered index are threaded for display at the communication device, as described with reference to FIGS. 13A and 13B.

An alternate deferral process is illustrated in FIG. 15. Rather than deferring allocation of a message with an intermediate status to its corresponding, pre-existing message thread, updating of the message's pre-existing thread is deferred by not updating the timestamp of the thread. At 1500, an update is received by the threading manager 280 indicating the existence of a new message in the filtered index. At 1505, the message data store is queried for message attribute information for determining a thread identifier and for determining the status of the message. The data is received at 1510, and the thread identifier computed at 1515, unless the thread identifier was already computed and available for retrieval. At 1520, it is determined whether the thread identifier matches an existing thread identifier in the threaded index. If it does not, then at 1525 a new entry is created in the threaded index with that message as the sole member of a thread corresponding to that identifier, and the new thread entry takes on the attributes of the new message, including timestamp and status. Any listeners or clients are notified at 1545.

If the computed thread identifier matches an existing identifier, then at 1530 it is determined whether the current status of the message is "transmitting". If the message is "transmitting", then at 1535 the existing thread entry is updated based on the attributes of the new message, including addition of the message identifier for the new message to the thread data, updating of the status to reflect that the thread is now "transmitting", and optionally updating of the thread subject line based on the subject line of the new message, but the timestamp of the thread is not updated to reflect the timestamp of the new message. Rather, the thread is left with its current timestamp. The clients are then notified at 1545.

If the message is not a "transmitting" message (for example, a "new" message, an "error" message, or a message with a status other than "transmitting") but does match an existing thread identifier, then a process similar to the message thread updating process for non-"transmitting" messages is followed at 1540. The existing thread entry in the index is updated with the new message identifier and any other thread attributes such as status, timestamp, and the like are updated based on the new message attributes. Again, any listeners or clients are notified of the change to the threaded index at 1545.

The result of this process is illustrated in FIG. 16. Recalling that the initial threaded, filtered user interface is illustrated in FIG. 10A or 7B with the message group listings 1020A, 1020C, 1020B' and 1020E listed first in reverse chronological order, in the user interface 1600 of FIG. 16 it can be seen that the second listing 1020C is replaced with new listing 1020C''', which has the same timestamp as original listing 1020C but has its other attributes updated to reflect that the message is being transmitted, such as the icon 1060. In this embodiment, then, coherence of the message listing is preserved, as the message listings remain in their previous order and the updated status of the thread 1020C is reflected within the conversation or message listing itself. At the same time, the user is notified of a status change to the thread, since the status icon 1610 displayed by the client application reflects the "transmitting" status of the most recent message in the thread. Once transmission of the message has completed and the message transitions to "sent", and the message is removed from the thread as described above, the message group listing 1020C'' will revert to its original content in the listing 1020C, but will remain in the same position in the user interface 1600. If transmission of the message fails and the message transitions to an "error" status, the message thread will be updated as described above, and the thread will be updated to reflect the inclusion of the "error" message as well as this new "error" message's timestamp. The user interface would accordingly transition to an order like that shown in FIG. 13C.

By deferring the updating of the message thread by the threading manager, whether by deferring assignment of the computed thread identifier to the message or by deferring an update to the message thread timestamp until such time that the message's transitory or intermediate attribute has been changed to a more persistent status, the foregoing solutions improve the coherence of a message group listing while the message is transitioning through the intermediate attribute value. Further, this solution avoids a reconfiguration of the filter object or filtering criteria.

Figure 17:
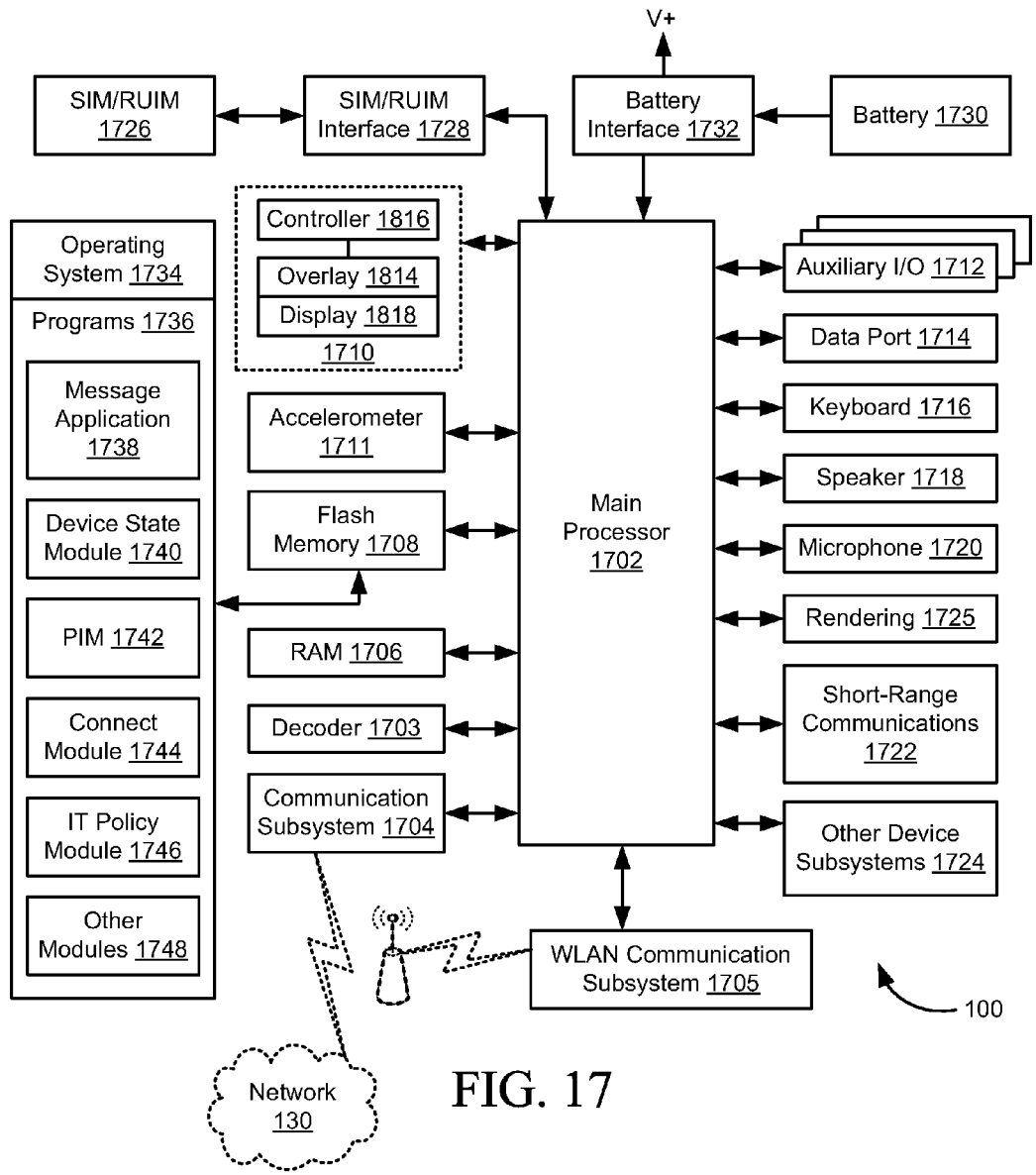
FIG. 17 is a block diagram of an embodiment of a mobile device for use with the embodiments of FIGS. 1 to 16.

The embodiments described herein for implementation on a computing device may be implemented on a communication device such as that illustrated in FIG. 17. The communication device may communicate with other devices over a wireless communication system. The communication device 100 may be a mobile device with two-way communication and advanced data communication capabilities including the capability to communicate with other mobile devices or computer systems through a network of transceiver stations. The communication device 100 can also have voice communication capabilities. However, it will be appreciated by those skilled in the art that the foregoing embodiments do not require a dual-mode communication device; it is sufficient for the device 100 to be provisioned for data communication only via a fixed or wireless connection. Wireless connectivity may be provided by means of on-board communication hardware, such as the communication subsystems 1704, 1705 described below, or using accessories such as a wireless dongle or mobile hotspot device, not shown.

FIG. 17 is a block diagram of an exemplary embodiment of a communication device 100. The communication device 100 includes a number of components such as a main processor 1702 that controls the overall operation of the communication device 100. Communication functions, including data and voice communications, are performed through a communication subsystem 1704. Data received by the communication device 100 can be decompressed and decrypted by decoder 1703, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26x and MPEG-x series standards.

The communication subsystem 1704 receives messages from and sends messages to a wireless network 130. In this exemplary embodiment of the communication device 100, the communication subsystem 1704 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 1704 with the wireless network 130 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 1705 also shown in FIG. 17. The WLAN communication subsystem may operate in accordance with a known network protocol such as one or more of the 802.11™ family of standards developed by IEEE. The communication subsystem 1705 may be separate from, or integrated with, the communication subsystem 1704 or with the short-range communications module 1722. The main processor 1702 also interacts with additional subsystems such as a Random Access Memory (RAM) 1706, a flash memory 1708, a display 1710, other data and memory access interfaces such as an auxiliary input/output (I/O) subsystem 1712 or a data port 1714, a keyboard 1716, a speaker 1718, a microphone 1720, the short-range communications 1722 and other device subsystems 1724. The communication device may also be provided with an accelerometer 1711, which may be used to detect gravity- or motion-induced forces and their direction. Detection of such forces applied to the device 100 may be processed to determine a response of the device 100, such as an orientation of a graphical user interface displayed on the display assembly 1710 in response to a determination of the current orientation of the device 100.

In some embodiments, the user device 100 may comprise a touchscreen-based device, in which the display interface 1710 is a touchscreen interface that provides both a display for communicating information and presenting graphical user interfaces, as well as an input subsystem for detecting user input that may be converted to instructions for execution by the device 100. The touchscreen display interface 1710 may be the principal user interface provided on the device 100, although in some embodiments, additional buttons, variously shown in the figures or a trackpad, or other input means may be provided. In one embodiment, a transmissive TFT LCD screen 1818 is overlaid with a clear touch sensor assembly 1814 that supports single and multi-touch actions such as tap, double-tap, tap and hold, tap and drag, scroll, press, flick, and pinch. The touchscreen display interface 1710 detects these single and multi-touch actions, for example through the generation of a signal or signals in response to a touch, which may then be processed by the processor 1702 or by an additional processor or processors in the device 100 to determine the location of the touch action, whether defined by horizontal and vertical screen position data or other position data. Touch location data may include an area of contact or a single point of contact, such as a point at or near a center of the area of contact. The touchscreen display interface 1710 may be provided with separate horizontal and vertical sensors or detectors to assist in identifying the location of a touch. A signal is provided to the controller 1816, shown in FIG. 17, in response to detection of a touch. The controller 1816 and/or the processor 1702 may detect a touch by any suitable contact member on the touch-sensitive display 1710.

Some of the subsystems of the communication device 100 perform communication-related functions, whereas other subsystems can provide "resident" or on-device functions. By way of example, the display 1710 and the keyboard 1716 can be used for both communication-related functions, such as entering a text message for transmission over the network 130, and device-resident functions such as a calculator or task list.

A rendering circuit 1725 is included in the device 100. When a user specifies that a data file is to be viewed on the display 1710, the rendering circuit 1725 analyzes and processes the data file for visualization on the display 1710. Rendering data files originally optimized or prepared for visualization on large-screen displays on a portable electronic device display often requires additional processing prior to visualization on the small-screen portable electronic device displays. This additional processing may be accomplished by the rendering engine 1725. As will be appreciated by those of skill in the art, the rendering engine can be implemented in hardware, software, or a combination thereof, and can comprise a dedicated image processor and associated circuitry, or can be implemented within main processor 1702.

The communication device 100 can send and receive communication signals over the wireless network 130 after required network registration or activation procedures have been completed. Network access is associated with a subscriber or user of the communication device 100. To identify a subscriber, the communication device 100 requires a SIM/RUIM/UICC card 1726 (i.e. Subscriber Identity Module, Removable User Identity Module, Universal Integrated Circuit Card, or the like) or another suitable identity module to be inserted into a SIM/RUIM/UICC interface 1728 in order to communicate with a network. The SIM/RUIM/UICC card 1726 is one type of a conventional "smart card" that can be used to identify a subscriber of the communication device 100 and to personalize the communication device 100, among other things. Without the SIM/RUIM/UICC card 1726, the communication device 100 is not fully operational for communication with the wireless network 130. By inserting the SIM/RUIM/UICC card 1726 into the SIM/RUIM/UICC interface 1728, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 1726 includes a processor and memory for storing information. Once the SIM/RUIM/UICC card 1726 is inserted into the SIM/RUIM/UICC interface 1728, it is coupled to the main processor 1702. In order to identify the subscriber, the SIM/RUIM/UICC card 1726 can include some user parameters such as an International Mobile Subscriber Identity (IMSI). An advantage of using the SIM/RUIM/UICC card 1726 is that a subscriber is not necessarily bound by any single physical mobile device. The SIM/RUIM/UICC card 1726 can store additional subscriber information for a mobile device as well, including datebook (or calendar) information and recent call information. Alternatively, user identification information can also be programmed into the flash memory 1708.

The communication device 100 may be a battery-powered device including a battery interface 1732 for receiving one or more rechargeable batteries 1730. In at least some embodiments, the battery 1730 can be a smart battery with an embedded microprocessor. The battery interface 1732 is coupled to a regulator (not shown), which assists the battery 1730 in providing power V+ to the communication device 100. Although current technology makes use of a battery, future technologies such as micro fuel cells can provide the power to the communication device 100.

The communication device 100 also includes an operating system 1734 and software components 1736 to 1746 which are described in more detail below. The operating system 1734 and the software components 1736 to 1746 that are executed by the main processor 1702 are typically stored in a persistent store such as the flash memory 1708, which can alternatively be a read-only memory (ROM) or similar storage element (not shown). Those skilled in the art will appreciate that portions of the operating system 1734 and the software components 1736 to 1746, such as specific device applications, or parts thereof, can be temporarily loaded into a volatile store such as the RAM 1706. Select other modules 1748 may also be included, such as those described herein. Other software components can also be included, as is well known to those skilled in the art.

The subset of software applications 1736 that control basic device operations, including data and voice communication applications, will normally be installed on the communication device 100 during its manufacture. Other software applications include a message application 1738 that can be any suitable software program that allows a user of the communication device 100 to send and receive electronic messages. Various alternatives exist for the message application 1738 as is well known to those skilled in the art. Messages that have been sent or received by the user are typically stored in the flash memory 1708 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 1740, a Personal Information Manager (PIM) 1742, and other suitable modules (not shown). The device state module 1740 provides persistence, i.e. the device state module 1740 ensures that important device data is stored in persistent memory, such as the flash memory 1708, so that the data is not lost when the communication device 100 is turned off or loses power.

The PIM 1742 includes functionality for organizing and managing data items of interest to the user, such as, but not limited to, e-mail, contacts, calendar events, voice mails, appointments, and task items. A PIM application has the ability to send and receive data items via the wireless network 130. PIM data items can be seamlessly integrated, synchronized, and updated via the wireless network 130 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 1742, or another suitable module. In addition, the items may be searchable using a unified search process implemented in the device operating system 1734. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 1744, and an information technology (IT) policy module 1746. The connect module 1744 implements the communication protocols that are required for the communication device 100 to communicate with the wireless infrastructure and any host system, such as a host system with which the communication device 100 is authorized to interface.

The connect module 1744 includes a set of Application Programming Interfaces (APIs) that can be integrated with the communication device 100 to allow the communication device 100 to use any number of services associated with the host system or with other systems accessible over the network 130. The connect module 1744 allows the communication device 100 to establish an end-to-end secure, authenticated communication pipe with the host system. A subset of applications for which access is provided by the connect module 1744 can be used to pass IT policy commands from the host system to the communication device 100. This can be done in a wireless or wired manner. These instructions can then be passed to the IT policy module 1746 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 130, the auxiliary I/O subsystem 1712, the data port 1714, the short-range communications subsystem 1722, or any other suitable device subsystem 1724. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 1714 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 1714 can be any suitable port that enables data communication between the communication device 100 and another computing device. The data port 1714 can be a serial or a parallel port. In some instances, the data port 1714 can be a USB port that includes data lines for data transfer and a supply line that can provide a charging current to charge the battery 1730 of the communication device 100.

The short-range communications subsystem 1722 provides for communication between the communication device 100 and different systems or devices, without the use of the wireless network 130. For example, the subsystem 1722 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 1704 and input to the main processor 1702. The main processor 1702 will then process the received signal for output to the display 1710 or alternatively to the auxiliary I/O subsystem 1712. A subscriber can also compose data items, such as e-mail messages, for example, using the keyboard 1716 in conjunction with the display 1710 and possibly the auxiliary I/O subsystem 1712. The auxiliary subsystem 1712 can include devices such as: a touchscreen, mouse, track ball, infrared fingerprint detector, or a roller wheel with dynamic button pressing capability. The keyboard 1716 may be an alphanumeric keyboard and/or telephone-type keypad. However, other types of keyboards can also be used. A composed item can be transmitted over the wireless network 130 through the communication subsystem 1704. It will be appreciated that if the display 1710 comprises a touchscreen, then the auxiliary subsystem 1712 may still comprise one or more of the devices identified above.

For voice communications, the overall operation of the communication device 100 is substantially similar, except that the received signals are output to the speaker 1718, and signals for transmission are generated by the microphone

1720. Alternative voice or audio I/O subsystems, such as a voice message recording subsystem, can also be implemented on the communication device 100. Although voice or audio signal output is accomplished primarily through the speaker 1718, the display 1710 can also be used to provide additional information such as the identity of a calling party, duration of a voice call, or other voice call related information.

The communication subsystem component 1704 may include a receiver, transmitter, and associated components such as one or more embedded or internal antenna elements, Local Oscillators (LOs), and a processing module such as a Digital Signal Processor (DSP) in communication with the transmitter and receiver. Signals received by an antenna through the wireless network 130 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP, then input to the transmitter for digital-to-analog (D/A) conversion, frequency up conversion, filtering, amplification and transmission over the wireless network 130 via an antenna. The DSP not only processes communication signals, but also provides for receiver and transmitter control, including control of gains applied to communication signals in the receiver and the transmitter. When the communication device 100 is fully operational, the transmitter is typically keyed or turned on only when it is transmitting to the wireless network 130 and is otherwise turned off to conserve resources. Similarly, the receiver is periodically turned off to conserve power until it is needed to receive signals or information (if at all) during designated time periods. Other communication subsystems, such as the WLAN communication subsystem 1705 or a WPAN communication subsystem, not shown, may be provided with similar components as those described above configured for communication over the appropriate frequencies and using the appropriate protocols. The particular design of the communication subsystem 1704, 1705, or other communication subsystem is dependent upon the communication network 130 with which the communication device 100 is intended to operate. Thus, it should be understood that the foregoing description serves only as one example.

The foregoing examples concerned an erstwhile "transmitting" message that transitions to a "sent" message, and is thereafter filtered out of the message collection used to populate the message display listing because the filter is defined to exclude messages with a "sent" attribute. When the filter is configured to suppress "sent" messages and an outbound message that is a reply or forward of a message in an existing thread is transmitted from the device, the filter will initially pass through the outbound message because it is "transmitting". The inbox or other message listing display module will assign the "transmitting" message to the existing thread identifier, and consequently the timestamp of the thread with that identifier is updated. As a result, the position of the thread in the inbox display will be altered based on the "transmitting" message's timestamp—it will "jump" the top of the inbox listing when the listing is ordered in reverse chronological order. When the message becomes a "sent" message, the filter will remove that message from the filtered collection, and consequently the message will be removed from the thread. The timestamp of the thread will therefore revert back to its previous timestamp and the thread will be returned to its original place in the message listing display. The deferral solutions described above mitigate this "jumping" within the message listing display.

These examples are specific instances of a general case in which a message display listing is populated from a filtered collection of messages, where a filtering criterion is based on an attribute that can take on intermediate values that transition to more permanent values, and the filtering criterion is defined to permit messages having the intermediate value but not a subsequent permanent value. The intermediate value may be a necessary precondition for achieving the permanent value; for example, it is generally found necessary for a "sent" message to have previously existed as a "transmitting" message. The end result is that the filtered index of messages enters a transient state where messages having this intermediate value are included, then subsequently removed. Any message collections, listeners, or clients dependent on this filtered index will also be affected by this transient state, since any "downstream" message collections are derived from the filtered index. As illustrated in FIGS. 10A and 10B, the effect may be a temporary loss of coherence or expected order in the message listing derived from that filtered index because one or more entries previously presented in the message listing is temporarily moved to a different position. In other words, filtering messages on a intermediate characteristic may, on occasion, result in anomalous behaviour from the user's point of view when those messages are collated for display in an ordered message listing. This apparently anomalous behaviour is apparent to the user because the affected listing entry was previously present in the listing (as in FIGS. 10A and 10B) in a different position; in cases where the "disappearing" listing entry did not previously appear in the display (as in the example of FIGS. 11A and 11B), the behaviour may not appear to be as disruptive to the user.

In a typical message inbox where the user sends and receives messages with typical frequency, the effect of this intermediate characteristic (such as the jumping about of a message listing as the message transitions from "transmitting" to "sent") is visually confusing because the rate at which the message listing display changes in response to this transition is significantly faster and therefore more noticeable than the typical "churn" rate of a message inbox, i.e., the average frequency at which new messages are added, received messages are read, and messages are deleted. Further, while a user may be accustomed to seeing reordering and other changes to a message inbox display in direct response to a user action (such as reading or deleting a message), the transition of a message from "transmitting" to "sent" is not directly in response to user action, which is also disconcerting or visually confusing to the user.

The undesirable effects of the transient state of the filtered index are more pronounced where the messages in the filtered index are grouped for presentation in a listing of message groups—for example, a set of conversations or message threads—that is collated according to a message group attribute other than the attribute used to create the filtered message set, that can take on different values depending on the membership of messages in the thread or conversation, and where message status and changes to the filtered index are automatically propagated to any users or clients of that filtered index. The undesirable effect may be manifested even when the listing of message groups is collated according to a criterion other than timestamp; for example, the listing may be collated according to a relative importance or priority of the message group, as determined by the content of the individual messages identified as members of that group.

The undesirable effect may also be manifested even when the event causing the message to be removed from the data store 210... 250 or the aggregated index is not a transition of the message's status from an intermediate value to a new value that causes the message to be filtered out, but is rather the message type or a different characteristic. For example, an idle process such as a "sniffer" may be executing in the background while a client messaging application is running on the communication device 100. The idle process may be configured to detect certain types of messages and automatically take certain actions on those messages. For example, the idle process may detect unopened calendar invitations (which are usually provided as attachments to received emails) and automatically reserve time in the user's calendar on a tentative basis, pending the user's acceptance or refusal of the invitation. The idle process could also detect received messages constituting meeting acceptances or refusals sent in response to a calendar invitation sent by the user, automatically update the corresponding calendar entry to reflect the invitee's response, then automatically delete the response from the user's inbox, even if unread. The idle process may be configured to implement other rules that may be defined by a user or administrator that may result in a changed status for a received or sent message. Because the process is configured to run in the background while the communication device 100 or the messaging application is idle, however, the user does not have direct control over when these rules are actually executed and message statuses are changed; yet, the changes made to the messages may result in the messages being removed from the filtered index, as described above, with the attendant changes to the message display listing. Thus, even though these messages are received and sent messages, and not "transmitting" messages, they are effectively in an intermediate state. like a message having an intermediate status, because they are of a type that will be automatically changed in response to a non-user-initiated event.

Accordingly, the embodiments described herein provide a communication device, comprising a processor and memory storing executable instructions which, upon execution by said processor, cause said communication device to: display a list of message threads collated according to a collating message thread attribute; detect a new message; when the detected new message comprises a persistent status, determine membership of the detected new message in one of said message threads; add said detected new message to said message thread; and update the collating message thread attribute of said message thread based on said membership; when the detected new message comprises an intermediate status, defer updating the collating message thread attribute of any of said message threads based on said membership of the detected new message in said message thread; and update the displayed list of message threads.

In a further aspect, the executable instructions may further cause said communication device to initially group messages in said filtered message collection into a plurality of message threads, and/or may further cause said communication device to, after the intermediate status transitions to the persistent status: detect a change in status in said detected new message; determine membership of said changed message in said one of said message threads and add said changed message to said message thread; update the collating message thread attribute of said message thread based on said membership; delete the new message thread; and update the displayed list of message threads In yet a further aspect, said executable instructions further cause said communication device to, after the intermediate status transitions to the persistent status: detect a change in status in said detected new message; update the collating message thread attribute of said message thread based on an attribute of said changed message; and update the displayed list of message threads.

The embodiments herein further provide a method, comprising: displaying a list of message threads collated according to a collating message thread attribute; detecting a new message; when the detected new message comprises a persistent status, determining membership of the detected new message in one of said message threads; adding said detected new message to said message thread; and updating the collating message thread attribute of any of said message threads based on membership of the detected new message in said message thread; when the detected new message comprises an intermediate status, deferring updating the collating message thread attribute of said message thread based on said membership; and updating the displayed list of message threads.

In a further aspect, the method further comprises initially grouping messages in said filtered message collection into a plurality of message threads.

In yet a further aspect, the method further comprises, after the intermediate status transitions to the persistent status: detecting a change in status in said detected new message; updating the collating message thread attribute of said message thread based on an attribute of said changed message; and updating the displayed list of message threads.

In another aspect, the method further comprises, after the intermediate status transitions to the persistent status: detecting a change in status in said detected new message; determining membership of said changed message in said one of said message threads and adding said changed message to said message thread; updating the collating message thread attribute of said message thread based on said membership; deleting the new message thread; and updating the displayed list of message threads.

In the foregoing device and method, the persistent status may be a sent status, and the intermediate status may be a transmitting status. Further, detecting the new message may comprise detecting the new message in a filtered message collection defined by a filter criterion comprising a specified status, and the specified status may be a status other than the sent status or transmitting status.

In still a further aspect, when the detected new message comprises the intermediate status, updating said collating message thread attribute based on said membership is deferred until said intermediate status transitions to the persistent status.

In yet another aspect, the collating message thread attribute is a message thread timestamp, and the message thread timestamp is determined from a latest timestamp associated with a message belonging to the message thread.

In another aspect, deferring updating the collating message thread attribute of said message thread comprises defining said detected new message for display in the list of message threads as a separate list entry. Alternatively, said deferring comprises: determining membership of the detected new message in said one of said message threads and adding said detected new message to said message thread; and updating attributes of said message thread other than said collating message thread attribute based on said membership. One of said updated attributes may be a status attribute of the message thread.

The embodiments herein also provide a communication device configured to display message threads, the communication device comprising: means adapted to display a list of message threads collated according to a collating message thread attribute; means adapted to detect a new message belonging to one of said message threads; means adapted to determine membership of the detected new message in one of said message threads and to add said detected new message to said message thread; means adapted to, when the detected new message comprises a persistent status, update the collating message thread attribute of said message thread to which said detected new message was added based on said membership; means adapted to, when the detected new message comprises an intermediate status, defer updating the collating message thread attribute of said message thread to which said detected new message was added based on said membership; and means adapted to update the displayed list of message threads.

In one aspect, the persistent status is a sent status and the intermediate status is a transmitting status.

In a further aspect, the device further comprises filtering means adapted to define a filtered message collection defined by a filter criterion comprising a specified status other than the sent status or transmitting status.

In still a further aspect, the further comprises means adapted to initially group messages in said filtered message collection into a plurality of message threads.

In another aspect, when the detected new message comprises the intermediate status, updating said collating message thread attribute based on said membership is deferred until said intermediate status transitions to the persistent status.

In yet another aspect, the collating message thread attribute is a message thread timestamp, said message thread timestamp being determined from a latest timestamp associated with a message belonging to said message thread.

In still another aspect, adding said detected new message to said message thread comprises updating, based on said membership, attributes of said message thread other than said collating message thread attribute.

The embodiments herein also provide a method of displaying message threads, the method comprising: displaying a list of message threads collated according to a collating message thread attribute; detecting a new message belonging to one of said message threads; determining membership of the detected new message in one of said message threads and adding said detected new message to said message thread; when the detected new message comprises a persistent status, updating the collating message thread attribute of said message thread to which said detected new message was added based on said membership; when the detected new message comprises an intermediate status, deferring updating the collating message thread attribute of said message thread to which said detected new message was added based on said membership; and updating the displayed list of message threads.

In one aspect of the method, the persistent status is a sent status and the intermediate status is a transmitting status.

In another aspect, the method further comprises providing a filtered message collection defined by a filter criterion comprising a specified status other than the sent status or transmitting status.

In yet another aspect, the method further comprises initially grouping messages in said filtered message collection into a plurality of message threads.

In a further aspect, when the detected new message comprises the intermediate status, updating said collating message thread attribute based on said membership is deferred until said intermediate status transitions to the persistent status.

In still a further aspect, the collating message thread attribute is a message thread timestamp, said message thread timestamp being determined from a latest timestamp associated with a message belonging to said message thread.

In still a further aspect, adding said detected new message to said message thread comprises updating, based on said membership, attributes of said message thread other than said collating message thread attribute.

The embodiments herein also provide a computer readable medium bearing executable code adapted to cause a communication device executing said code to carry out the method and variants described above.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A communication device, including:
   a processor; and
   memory storing executable instructions which, upon execution by the processor, cause the communication device to:
   display a list of message threads collated according to a collating message thread attribute, each message thread comprising one or more messages received at the communication device by a sender or sent from the communication device to a recipient;
   detect a new message;
   when the detected new message comprises a persistent status, determine membership of the detected new message in one of the message threads; add the detected new message to said message thread; and
   update the collating message thread attribute of said message thread based on the membership;
   when the detected new message comprises an intermediate status, determine membership of the detected new message in said one of the message threads, and add the detected new message to said message thread; and
   update attributes of said message thread other than the collating message thread attribute based on the membership; and
   update the displayed list of message threads,
   wherein detection of the new message comprises detecting the new message in a filtered message collection defined by a filter criterion comprising a specified status, and the specified status is a status other than said persistent status or intermediate status.

2. The communication device of claim 1, wherein the persistent status is a sent status and the intermediate status is a transmitting status.

3. The communication device of claim 1, wherein when the detected new message comprises the intermediate status, the collating message thread attribute is updated based on the membership after the intermediate status transitions to the persistent status.

4. The communication device of claim 1, wherein the one or more messages and the new message comprise email messages.

5. A method, comprising:
   displaying a list of message threads collated according to a collating message thread attribute, each message thread comprising one or more messages received at a communication device by a sender or sent from the communication device to a recipient;
   detecting a new message, wherein detecting a new message comprises detecting the new message in a filtered message collection defined by a filter criterion comprising a specified status; and the specified status is a status other than said persistent status or intermediate status;
   when the detected new message comprises a persistent status,
   determining membership of the detected new message in one of said message threads;
   adding said detected new message to said message thread; and
   updating the collating message thread attribute of said message thread based on said membership;
   when the detected new message comprises an intermediate status,
   determining membership of the detected new message in said one of the message threads, and adding the detected new message to said message thread; and
   updating attributes of said message thread other than the collating message thread attribute based on the membership; and
   updating the displayed list of message threads.

6. The method of claim 5, wherein the persistent status is a sent status.

7. The method of claim 6, wherein the intermediate status is a transmitting status.

8. The method of claim 5, wherein the persistent status is a sent status, the intermediate status is a transmitting status, and the specified status is a status other than the sent status or transmitting status.

9. The method of claim 5, further comprising initially grouping messages in the filtered message collection into a plurality of message threads.

10. The method of claim 5, wherein when the detected new message comprises the intermediate status, updating the collating message thread attribute based on said membership occurs after the intermediate status transitions to the persistent status.

11. The method of claim 5, wherein the one or more messages and the new message comprise email messages.

12. The method of claim 5, wherein a status attribute of said message thread is updated.

13. The method of claim 5, further comprising, after the intermediate status transitions to the persistent status:
    detecting a change in status in the detected new message;
    updating the collating message thread attribute of said message thread based on an attribute of the detected new message with changed status; and
updating the displayed list of message threads.

14. A non-transitory communication device-readable medium bearing code which, when executed by one or more processors of a communication device, causes the communication device to implement the method of:
   displaying a list of message threads collated according to a collating message thread attribute, each message thread comprising one or more messages received at the communication device by a sender or sent from the communication device to a recipient;
   detecting a new message, wherein detecting the new message comprises detecting the new message in a filtered message collection defined by a filter criterion comprising a specified status, and the specified status is a status other than a persistent status or an intermediate status;
   when the detected new message comprises the persistent status,
   determining membership of the detected new message in one of said message threads;
   adding said detected new message to said message thread; and
   updating the collating message thread attribute of said message thread based on said membership;
   when the detected new message comprises the intermediate status, determining membership of the detected new message in said one of the message threads, and adding the detected new message to said message thread; and updating attributes of said message thread other than the collating message thread attribute based on the membership; and updating the displayed list of message threads.

15. The non-transitory communication device-readable medium of claim 14, wherein the persistent status is a sent status.

16. The non-transitory communication device-readable medium of claim 14, wherein the intermediate status is a transmitting status.

17. The non-transitory communication device-readable medium of claim 14, wherein when the detected new message comprises the intermediate status, the collating message thread attribute is updated based on the membership after the intermediate status transitions to the persistent status.

18. The non-transitory communication device-readable medium of claim 14, wherein one or more messages and the new message comprise email messages.

* * * * *